（12） United States Patent
Kuwata et al.

(10) Patent No.: US 7,508,548 B2
(45) Date of Patent: Mar. 24, 2009

(54) IMAGE PROCESSING METHOD AND IMAGE PROCESSING APPARATUS

(75) Inventors: Naoki Kuwata, Nagan-ken (JP); Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 40 days.

(21) Appl. No.: 11/739,858

(22) Filed: Apr. 25, 2007

(65) Prior Publication Data

US 2007/0201763 A1    Aug. 30, 2007

Related U.S. Application Data

(60) Continuation of application No. 10/742,718, filed on Dec. 22, 2003, now Pat. No. 7,259,894, which is a division of application No. 09/093,094, filed on Jun. 8, 1998, now Pat. No. 6,738,527.

(30) Foreign Application Priority Data

| Jun. 9, 1997 | (JP) | ................................. 9-151413 |
| Jun. 17, 1997 | (JP) | ................................. 9-160159 |
| Oct. 16, 1997 | (JP) | ................................. 9-284138 |
| Oct. 27, 1997 | (JP) | ................................. 9-294051 |

(51) Int. Cl.
   *G06K 9/40*    (2006.01)

(52) U.S. Cl. ....................... 358/3.01; 382/254; 382/266; 358/448

(58) Field of Classification Search .................. 382/266, 382/254, 168; 358/443, 448, 455, 456, 462, 358/464, 3.01, 3.06

See application file for complete search history.

(56) References Cited

U.S. PATENT DOCUMENTS

| 4,642,683 A | 2/1987 | Alkofer |
| 4,727,434 A | 2/1988 | Kawamura |

(Continued)

FOREIGN PATENT DOCUMENTS

DE    43 09 878 A    11/1993

(Continued)

*Primary Examiner*—Thomas D Lee
(74) *Attorney, Agent, or Firm*—Sughrue Mion, PLLC

(57) ABSTRACT

In image processing according to the prior art, the important part of photographic image data (referred to herein as the object) could not be determined and therefore required human participation.

A computer 21 which is the core of image processing calculates an edginess which is an image variation from a differential value of data for adjacent picture elements in a step SA110, and determines object picture elements by selecting only images with a large variation in steps SA120, SA130. As optimum parameters for contrast correction and lightness compensation are calculated from image data for object picture elements in steps SA310-SA330, image processing indicators based on object picture elements are determined, and optimum image processing can be performed automatically. After summing a luminance distribution for each area of the image, which is a feature amount, while uniformly selecting picture elements in a step SB110, a reevaluation is performed by a weighting determined for each area in a step SB120, and a luminance distribution strongly influenced by the luminance distribution of the photographed object is thus obtained with uniform sampling. After determining the intensity of this luminance distribution in steps SB130-SB150, the image data is converted in a step SB160, and image processing can therefore be performed with optimum intensity while reducing the processing amount.

7 Claims, 35 Drawing Sheets

U.S. PATENT DOCUMENTS

| | | | |
|---|---|---|---|
| 4,794,531 A | 12/1988 | Morishita et al. | |
| 4,899,216 A | 2/1990 | Tatsumi et al. | |
| 4,931,864 A | 6/1990 | Kawamura et al. | |
| 5,012,333 A | 4/1991 | Lee et al. | |
| 5,130,935 A | 7/1992 | Takiguchi | |
| 5,150,433 A | 9/1992 | Daly | |
| 5,173,769 A | 12/1992 | Hashimoto | |
| 5,282,255 A | 1/1994 | Bovik et al. | |
| 5,323,241 A | 6/1994 | Yonezawa | |
| 5,347,374 A | 9/1994 | Fuss et al. | |
| 5,353,132 A | 10/1994 | Katsuma | |
| 5,392,137 A | 2/1995 | Okubo | |
| 5,450,531 A | 9/1995 | Ng et al. | |
| 5,461,490 A | 10/1995 | Yonezawa | |
| 5,497,431 A | 3/1996 | Nakamura | |
| 5,508,743 A | 4/1996 | Iizuka | |
| 5,537,494 A | 7/1996 | Toh | |
| 5,581,370 A * | 12/1996 | Fuss et al. | 358/447 |
| 5,710,829 A | 1/1998 | Chen et al. | |
| 5,862,264 A | 1/1999 | Ishikawa et al. | |
| 5,970,179 A | 10/1999 | Ito | |
| 5,982,926 A | 11/1999 | Kuo et al. | |
| 6,118,895 A | 9/2000 | Hirota et al. | |
| 6,198,841 B1 | 3/2001 | Toyama et al. | |

FOREIGN PATENT DOCUMENTS

| | | |
|---|---|---|
| EP | 0 330 455 A | 8/1989 |
| EP | 0 481 525 A | 4/1992 |
| EP | 0 557 099 A | 8/1993 |
| EP | 0 593 275 A | 4/1994 |
| EP | 0 741 496 A | 11/1996 |
| EP | 0 883 086 A | 12/1998 |
| EP | 0 886 437 A | 12/1998 |
| JP | 2-205984 A | 8/1990 |
| JP | 03-102478 | 4/1991 |
| JP | 3-206572 | 9/1991 |
| JP | 5-216993 | 8/1993 |
| JP | 5-260370 | 10/1993 |
| JP | 6-152962 A | 5/1994 |
| JP | 6-153054 | 5/1994 |
| JP | 6-215128 A | 8/1994 |
| JP | 7-160885 | 6/1995 |
| JP | 7-184072 | 7/1995 |
| JP | 07-306938 | 11/1995 |
| JP | 08-107560 | 4/1996 |
| JP | 08-202868 A | 8/1996 |
| JP | 8-251402 A | 9/1996 |
| JP | 08-251432 A | 9/1996 |
| JP | 8-307722 | 11/1996 |
| JP | 8/329241 A | 12/1996 |
| JP | 9-65139 A | 3/1997 |
| JP | 09-094243 | 4/1997 |
| JP | 9-154044 | 6/1997 |
| JP | 9-171558 | 6/1997 |
| JP | 9-179977 A | 7/1997 |
| JP | 9-200531 | 7/1997 |
| JP | 09-247483 | 9/1997 |
| JP | 9-266539 | 10/1997 |
| WO | WO 98 35318 A | 8/1998 |

* cited by examiner

| f(x-1, y+1) | f(x, y+1) | f(x+1, y+1) |
| --- | --- | --- |
| f(x-1, y) | f(x, y) | f(x+1, y) |
| f(x-1, y-1) | f(x, y-1) | f(x+1, y-1) |

FIG. 16
| y | Y |
|---|---|
| 0 | 0 |
| ymin | 5 |
| ⋮ | ⋮ |
| ymax | 250 |
| 255 | 255 |
FIG. 17
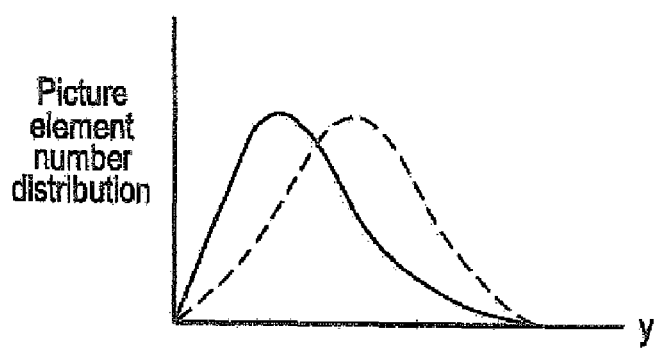
FIG. 18
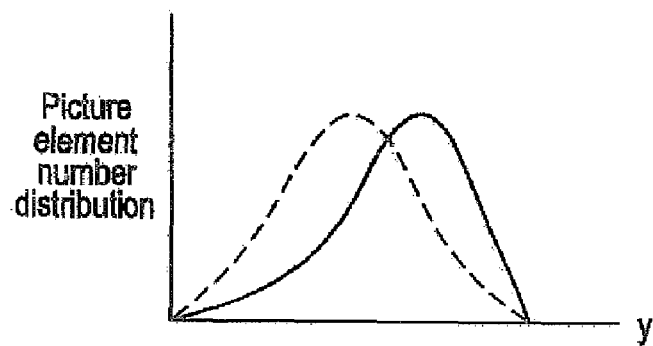

| 5x5 | i=-2 | -1 | 0 | 1 | 2 |
|---|---|---|---|---|---|
| j=-2 | 0 | 2 | 4 | 2 | 0 |
| -1 | 2 | 20 | 46 | 20 | 2 |
| 0 | 4 | 46 | 100 | 46 | 4 |
| 1 | 2 | 20 | 46 | 20 | 2 |
| 2 | 0 | 2 | 4 | 2 | 0 |

41

396

FIG. 28
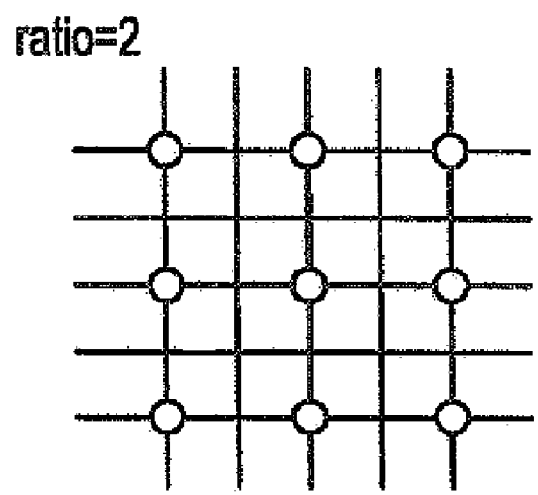
ratio=2
FIG. 30A
FIG. 30B
FIG. 30C
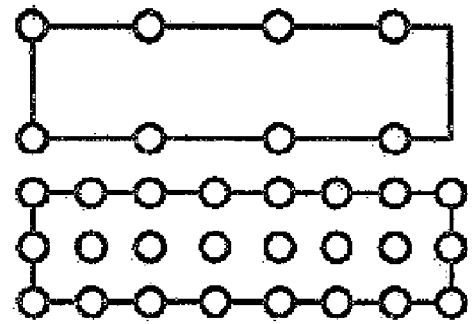
Bitmap Block division Luminance distribution dYi for block Bi

FIG. 33

| 1 | 3 | 1 |
|---|---|---|
| 5 | 8 | 5 |
| 8 | 10 | 8 |
| 5 | 8 | 5 |
| 1 | 3 | 1 |

Center point emphasized

FIG. 34

| 1 | 2 | 1 |
|---|---|---|
| 2 | 4 | 2 |
| 4 | 6 | 4 |
| 6 | 8 | 6 |
| 8 | 10 | 8 |

Center lower point emphasized

FIG. 37A

| -1 | -1 | -1 |
|----|----|----|
| -1 | 8  | -1 |
| -1 | -1 | -1 |

FIG. 37B

|    | -1 |    |
|----|----|----|
| -1 | 4  | -1 |
|    | -1 |    |

FIG. 37C

| -1 |   | -1 |
|----|---|----|
|    | 4 |    |
| -1 |   | -1 |

FIG. 37D

|    | -1 |    |
|----|----|----|
|    | 2  |    |
|    | -1 |    |

FIG. 37E

|    |    |    |
|----|----|----|
| -1 | 2  | -1 |
|    |    |    |

FIG. 37F

|    |    |    |
|----|----|----|
|    | 1  |    |
|    | -1 |    |

Center block

Edge block

Pure addition

Weighting addition

IMAGE PROCESSING METHOD AND IMAGE PROCESSING APPARATUS

This is a continuation of application Ser. No. 10/742,718 filed Dec. 22, 2003 which is a divisional of application Ser. No. 09/093,094 filed Jun. 8, 1998, issued as U.S. Pat. No. 6,738,527, the disclosures in which are incorporated herein by reference.

BACKGROUND OF THE INVENTION

1. Field of the Invention

This invention relates to an image processing method wherein an optimum image processing is performed automatically on photograph image data such as digital photograph image, and the image is evaluated, to an image processing apparatus, a medium on which an image processing control program is recorded, an image evaluation device, an image evaluation method, and a medium on which an image evaluation program is recorded.

2. Description of the Prior Art

Various kinds of image processing may be performed on digital image data, i.e., in which processing: contrast may be increased; color may be corrected; or lightness may be corrected. This image processing can usually be performed with a microcomputer. An operator confirms the image on a monitor, the necessary image processing is selected, and image processing parameters are determined.

In recent years various types of image processing techniques have been proposed, and are now having considerable impact. However, a human operator is still required when it is a question of which technique to apply, and to what extent it should be used. This is because it was otherwise impossible to determine which digital image data had to be subjected to image processing. For example, in the case of image processing to correct the lightness of an image, the screen is made lighter if it is dark on the whole, and is made darker if it is too light.

Now, consider the case of a photographic image of a person filmed at night, where the background is near to pitch-darkness but the person in the picture has been well photographed. If this photograph is automatically corrected, it is attempted to make the image brighter due to the fact that the background is pitch black, so the final image appears as if the photo was taken in the daytime.

In this case, if a human operator is involved, he pays attention only to the person in the picture. If the image of the person is dark, it would be made a little brighter, conversely darkening would be selected if the effect of flash, etc., was too bright.

Hence, there was a problem in the prior art in that a human operator had to participate to determine the important part (referred to hereafter as the "object") of a photographic image.

However, even when the importance of the image is evaluated by some technique, the determination process is performed in picture element units, and varying the importance in real time causes an increase in computation.

SUMMARY OF THE INVENTION

It is therefore an object of this invention, which was conceived in view of the aforesaid problems, to provide an image processing method which permits an important part of a photographic image such as a digital photograph image to be detected, and an optimum image processing to be automatically selected, to provide an image processing apparatus, and to provide a medium on which an image processing control program is recorded.

In order to achieve the aforesaid object, this invention is an image processing apparatus into which photographic image data comprising dot matrix picture elements is input, and which performs predetermined image processing on the input data. The apparatus comprises an image processing acquiring unit which acquires the aforesaid photographic image data, an image processing indicator specifying unit which performs predetermined summation processing on picture elements and specifies an image processing indicator based on the acquired image data, and a processing unit which determines image processing contents based on the specified image processing indicator, wherein the aforesaid image processing indicator specifying unit comprises an object determining unit which determines picture elements having a large image variation amount to be those of the object, and the aforesaid processing unit determines image processing contents based on image data for picture elements determined to be those of the object and performs image processing on the determined contents.

Herein, it is assumed that in the case of an image of a photographic image of a person, the person is usually photographed in the center of the field. Therefore, the person is brought into focus to give a sharp image. When the image is sharp, the outline part becomes clear, and the amount of image variation becomes large. As a result, there is an extremely high possibility that there will be no error if it is assumed that picture elements with a large image variation amount are those of the original object which has been brought into focus.

In the invention thus comprised, in the image processing indicator specifying unit based on photographic image data comprising dot matrix picture elements acquired in the image data acquiring unit, predetermined summation processing is performed on picture elements. This summation processing may take various forms, and the image processing indicator is basically specified based on the summation result. In the processing unit, the image processing contents are determined based on the specified indicator, and the determined image processing is performed.

This means that useful information about the corresponding image can be obtained by performing summation processing on dot matrix photographic image data, and image processing is performed on the data. In this way, the image processing indicator is specified by actual photographic image data, so optimum image processing can be performed even without human intervention.

The photographic image data comprises dot matrix picture elements and image processing is performed in picture element units, but first, in the object determining unit, picture elements having a large image variation are determined to be those of the object. Image processing contents are then determined in the processing unit based on image data for picture elements determined to be those of the object, and image processing is performed based on the determined contents.

Therefore, according to this invention, the determination of the object, which in the past required human participation, can be automated by determining the object as picture elements with a large image variation. The invention therefore provides an image processing method whereby optimum image processing can be performed by suitably modifying the image processing contents according to the object.

This method for specifying an image processing indicator from actual photographic data may of course be applied not only to a real device but also to a system on the method. In such a sense, this invention is also an image processing method wherein photographic image data comprising dot matrix picture elements is input, and predetermined image processing is performed, this image processing method comprising an image data acquiring step for acquiring the aforesaid photographic image data, an image processing indicator specifying step for performing a predetermined summation processing on picture elements based on this acquired image data, and specifying an image processing indicator, and a processing step for determining image processing contents based on the specified indicator, and performing image processing, wherein the aforesaid image processing indicator specifying step comprises an object determining step wherein picture elements having a large image variation amount are determined to be those of the object, and wherein in the aforesaid processing step, image processing contents are determined based on image data for picture elements determined to be those of the object, and image processing is performed based on the determined image processing contents. In this case, the apparatus offers all the attendant benefits and advantages of the invention.

This apparatus for determining an object and performing image processing method may be implemented by a stand-alone apparatus as mentioned above, or may be incorporated in another instrument which comprises such an apparatus. In other words, the scope of this invention covers various forms of implementation It may also be implemented by hardware or software, and can be modified as necessary.

When the apparatus for implementing the concept of this invention is implemented by software, the invention applies equally to media on which this software is recorded and which can be used in exactly the same way. In this sense, this invention is also a recording medium whereon an image processing control program is recorded for inputting photographic image data comprising dot matrix picture elements by a computer, and which performs predetermined image processing on the input data. The control program comprises an image processing indicator specifying step for acquiring the aforesaid photographic image data, an image processing indicator specifying step for performing predetermined summation processing on picture elements and specifying an image processing indicator, and a processing step for determining image processing contents based on the specified image processing indicator, wherein the aforesaid image processing indicator specifying step comprises an object determining step which determines picture elements having a large image variation amount to be those of the object, and in the aforesaid processing step, image processing contents are determined based on image data for picture elements determined to be those of the object, and image processing is performed on the determined contents. In this case, the recording medium offers all the attendant benefits and advantages of the invention.

The recording medium may of course be a magnetic recording medium, an optomagnetic recording medium, or any kind of recording medium which may be developed in the future. It will of course be understood that the medium may be a first copy or second copy, and that a telecommunication line may also be used to supply the program In this case, there is no difference regarding the application of the invention. There is also no difference if the program is written on a semiconductor chip.

There is no difference as regards the concept of the invention even if one part is software, and one part is implemented with hardware, or when it is in such a form that one part is stored on a recording medium which can be read when necessary.

Photographic image data means image data obtained when it is attempted to take a photograph of a real object. Image processing tries to correct images by comparing the images with the real objects from which they were acquired. The invention therefore applies not only to natural objects but also to manmade ones. More specifically, this includes image data read by a scanner, or image data captured by a digital camera.

Various techniques may be employed to determine the variation of picture elements in the object determining step. A further object of this invention is to give a specific example of this.

In the image processing method provided by this invention, in the aforesaid object determining step, the amount of variation of picture elements is determined based on a difference between adjacent picture elements.

Hence according to this invention in the object determining unit where an image variation amount is determined, the determination is performed based on a difference of image data between adjacent picture elements. When there is a fixed interval between picture elements as in the case of a dot matrix, the difference of data between adjacent picture elements is directly proportional to a first order differential. This difference can be taken as the variation amount of the image. In this case the difference is regarded as the magnitude of a vector, and the vector may also be constructed by considering adjacent directions.

According to this invention, only the difference of image data between adjacent picture elements is found. Computation is therefore easy, and the processing amount for object determination can be reduced.

The determination of an object is of course not limited to this technique, and it is a further object of this invention to provide other examples.

According to the image processing apparatus provided by this invention, in the aforesaid object determining unit, the criterion for determining whether or not there is a large image variation amount changes according to the position of the image In the case of a photograph for example, a person is often photographed in the center. In this case it may be said that in order to determine image processing content, the picture elements to be determined as the object should be selected from the central part of the field. However, it may be said that whether or not there is a large variation in the image depends on a difference from a comparison value, and there is no reason why such a value always has to be constant.

Therefore, to determine whether or not there is a large image amount according to this invention, in the object determining unit, this criterion is altered depending on the position of the image, the criterion for each position being compared with the image variation amount of each picture element.

Hence, according to this invention, the assessment of image variation changes depending on the position of the image, and a highly flexible determination which considers image composition is thus possible.

The criterion can be altered in various ways. As one example, a certain trend may be ascertained, or alternatively, a trend which causes a change may be read from the image.

A further object of this invention is to provide an example of the former.

In the image processing apparatus provided by this invention, in the object determining unit, the aforesaid criterion is set lower for the central part than for the edges of the image.

By setting the criterion lower for the center than for the edges, it is easier to determine the center part of the image as the object even if the variation amount at the center and at the edges is approximately the same. Therefore if there is an image of a person in the central part, the picture elements of this person will be determined as the object more frequently.

According to this invention, a determination can be made which gives more weight to the center area of a photograph, and a large amount of image data can be effectively processed.

A further object of this invention is to provide an example of the latter when the criterion is varied.

According to the image processing apparatus provided by this invention, in the aforesaid object determining unit, the above criterion is based on the distribution of the aforesaid image variation amount at different points on the image.

Hence according to this invention, in the object determining unit, the distribution of image variation is found in each part of the image, and the aforesaid criterion is determined after finding this distribution. Subsequently, a comparison is made with this criterion to determine whether or not the picture elements are those of the object.

According to this invention, as the object is determined taking account of the distribution of image variation for picture elements, the image data can be treated flexibly.

When the criterion is determined based on distribution, it may be considered that there is a high possibility of finding the object in a part where there are many picture elements with a large variation amount, and the criterion maybe set low.

Alternatively, basic setting patterns may first be prepared according to a variation distribution pattern, and a basic setting pattern may then be chosen based on the detected distribution pattern.

At the same time, assuming that the image processing indicator specifying unit comprises such an object determining unit, the image processing contents may be determined based on image data which is determined to be that of the object, and image processing may then be performed on the determined contents, there being no limitation on the specific processing method employed. For example, a luminance distribution of picture elements determined to be those of the object is found, and if the luminance distribution range is enlarged in a predetermined proportion when the luminance distribution is narrow, image processing to increase contrast is performed. If the luminance distribution of the object seems dark on the whole, a correction may be made to make it lighter. The color distribution of picture elements determined to be those of the object is found, and it is determined whether or not the grey balance is off. If it seems to be off, tone curves are used to modify the grey balance.

Hence, the importance of the image has an effect even if the image data is summed in order to specify the image processing indicator. However, even if the importance of the image is determined by some technique, the work is carried out in picture element units, so varying the importance of an image in real time implies an increase of computational amount.

A further object of this invention is to consider the importance of photographic image data such as digital photograph images in relatively simple terms, and perform optimum image processing automatically.

The image processing apparatus provided by this invention is an apparatus for inputting photographic image data comprising dot matrix picture elements, and performing predetermined image processing. This image processing apparatus comprises an image data acquiring unit for acquiring the aforesaid photographic image data, an image processing indicator specifying unit which performs a predetermined summation processing on picture elements based on this acquired image data and specifies an image processing indicator, and a processing unit which determines image processing contents based on the specified indicator and performs image processing The aforesaid image processing indicator specifying unit comprises a feature amount uniform sampling unit which determines an image processing intensity by uniformly sampling a feature amount over a whole screen, and a feature amount weighting reevaluation unit which reevaluates the feature amount sampled in the feature amount sampling unit with a predetermined weighting. In the aforesaid image processing unit, the image processing intensity is determined based on the reevaluated feature amount, and image processing is performed with the determined intensity.

According to the invention having the above construction, photographic image data comprises dot matrix picture elements, and in the feature amount uniform sampling unit, the feature amounts of picture elements are uniformly sampled over the whole screen. In the feature amount weighting reevaluation unit, the feature amounts that are sampled in this feature amount uniform sampling unit are reevaluated with a predetermined weighting. Then, in the processing unit, the image processing intensity is determined based on the feature amounts that have been reevaluated in this way, and image processing is performed.

In other words, as the sampling is uniform over the whole screen and a predetermined weighting is applied after sampling, the feature amounts obtained as a result are different from what is obtained by uniform sampling over the whole screen.

According to this invention the sampling in the sampling stage is uniform over the whole screen, so the computational amount is not too high. At the same time, by applying a predetermined weighting after sampling, irrelevant evaluation is not made as it would be if the picture elements were merely sampled uniformly without weighting The invention therefore provides an image processing apparatus in which optimum image processing can be performed automatically.

It will be understood that the technique of performing a uniform sampling in the sampling stage and applying a predetermined weighting thereafter, may be applied not only to a real device but also to a system in both of which cases it has all the attendant benefits and advantages of this invention. As a specific example of the concept of this invention, when the image processing apparatus is implemented in terms of software, there naturally exist recording media on which the software is recorded which can be used to perform the function of the invention.

The feature amount uniform sampling unit uniformly samples feature amounts over the whole screen, for determining the image processing intensity. For this purpose, all picture elements over the whole screen can be sampled, but it is not necessary to sample all of the picture elements if the sampling is uniform.

A further object of this invention is to provide an example of the latter case.

According to the image processing apparatus of this invention, in the aforesaid feature amount uniform sampling unit, the aforesaid feature amounts are sampled for selected picture elements after uniformly thinning out the picture elements according to predetermined criteria.

According to this invention, by thinning out the picture elements according to predetermined criteria, the number of picture elements to be processed is reduced, and the aforesaid feature amounts are sampled from the remaining elements.

Herein, the term "uniform thinning" comprises the case where picture elements are selected at a fixed interval, and the case where they are selected at random.

According to this invention, as the picture elements are thinned out when the feature amounts are uniformly sampled, the processing amount is reduced.

The sampled feature amounts are reevaluated by a predetermined weighting in the feature amount weighting reevaluation unit. The sampled feature amounts are in picture element units, but the weighting can be applied either to picture element units or to suitable aggregates of picture elements.

A further object of this invention is to provide an example of the latter case.

According to the image processing apparatus of this invention, in the aforesaid feature amount uniform sampling unit, feature amounts are sampled in area units that are divided according to predetermined criteria, and in the aforesaid feature amount weighting reevaluation unit, a weighting is set for each area and the feature amounts are then reevaluated.

The invention as formulated hereabove assumes weightings in area units of the image that are divided according to predetermined criteria. In the feature amount uniform sampling unit, feature amounts are sampled in these area units, while in the aforesaid feature amount weighting reevaluation unit, the feature amounts are reevaluated with weightings set for each area.

The division of these areas may always be constant, or it may be made to vary for each image. In this latter case the division method may be changed according to the contents of the image.

According to this invention, as the weighting is made to vary for each area, the computation is relatively simple.

Any type of weighting technique can be employed provided that reevaluation is performed without merely performing uniform sampling.

A further object of this invention is to provide an example of this.

According to the image processing apparatus of this invention, in the aforesaid feature amount weighting reevaluation unit, the aforesaid weighting is made to vary by a correspondence relation determined by the position of picture elements in the image.

In the case of a photograph, the person is usually in the center. Therefore, by weighting the central part of the image more heavily after uniformly sampling feature amounts from the whole image, the feature amounts sampled from picture elements relating to the person are evaluated to be larger.

When for example according to the invention thus comprised, the weighting of the central part of the image is heavier and the weighting of the surroundings is lighter, in the feature amount weighting reevaluation unit, the position of picture elements in the image is determined, and a reevaluation is made using a weighting which varies according to this position.

Hence according to this invention, as the weighting is determined according to the position of picture elements, the computation is relatively simple.

The weighting technique is of course not limited to this method, and a further object of this invention is to provide other examples.

According to the image processing apparatus provided by this invention, in the aforesaid feature weighting reevaluation unit, the image variation amount is found, and a heavier weighting is given to parts where the image variation amount is larger.

In the invention thus comprised, the image variation amount is found before performing reevaluation in the feature amount weighting reevaluation unit. The image variation amount is also known as image sharpness, and as the outline is sharper the better the focus, the variation is large where the image is in focus. On a photograph, the part which is in focus is the subject, and the part which is not in focus is considered to be the background. Therefore, places where there is a large image variation are considered to correspond to the subject. In the feature amount weighting reevaluation unit, the same result as sampling a large number of feature amounts is obtained by applying heavy weighting to parts where there is a large image variation.

According to this invention, as the weighting is varied depending on image sharpness, different targets can be precisely identified and feature amounts can be sampled for different images.

As another example of a weighting technique, in the weighting reevaluation unit of the image processing apparatus of the invention, the chromaticity of picture elements is found, a number of picture elements is found for which the chromaticity lies within the chromaticity range of the target for which it is desired to sample a feature amount, and heavier weighting is applied to parts where there are many of these picture elements.

Hence according to this invention, in the feature amount weighting reevaluation unit, the chromaticity of picture elements is found. In image processing, an object can sometimes be specified by a specific chromaticity. For example, there is no reason why a person could not be identified by looking for skin color, but it is difficult to specify skin color as color data also contain luminance elements. Chromaticity on the other hand represents an absolute proportion of a color stimulation value, and it is not controlled by luminance. Therefore an image of a person could be determined if the chromaticity was within a specified range that can be taken as indicative of skin color. This reasoning may of course also be applied to the green of the trees or the blue of the sky.

As specified objects can be sorted by chromaticity according to this invention, different targets may be precisely sampled depending on their images and feature amounts sampled.

Therefore in a feature amount weighting reevaluation unit, when the chromaticity found for picture elements is within a chromaticity range for a target from which it is intended to sample feature amounts, plural picture elements are counted. When the number of picture elements is large, this part of the image is determined to be the target, heavy weighting is applied, and a large feature amount is sampled from the target.

This weighting technique is not necessarily the only alternative, and it is a further object of this invention to provide a suitable example of overlapping methods.

According to the image processing apparatus of this invention, in the aforesaid feature amount weighting reevaluation unit, temporary weightings are applied based on a plurality of factors, and these factors are then added according to their degree of importance to give final weighting coefficients.

According to the invention as thus comprised, in the feature amount weighting reevaluation unit, temporary weighting coefficients are found separately based on a plurality of factors, and the weightings are added according to their degree of importance so as to reevaluate the sampled feature amounts as final weighting coefficients. Therefore, it may occur that even when a large weighting is assigned by one weighting method in the evaluation stage, if the method does not have a large importance, the final weighting which is assigned is not large. Moreover, it may occur that even if there is a large difference between weighting methods, image parts which are evaluated to have an average or higher weighting also have a large final weighting.

According to this invention, plural weighting techniques are suitably combined so that a suitable feature amount evaluation can be performed.

Therefore it the image processing indicator specifying unit itself comprises plural forms, it is not necessary to perform image processing with only one of these forms.

However even if there are some cases where it is desirable to perform image processing using the feature amount of the object, there are other cases where it is desirable to perform image processing using an average feature amount for the whole photographic image. For example, when a photograph is taken of a person, the person may not always be the lightest (highlighted) part of the picture. Therefore if attention is paid only to the person in the picture and contrast is increased, the highlighted part of the background will be too white. In this case, a better result would be obtained by paying attention to the whole photographic image.

Hence when image processing is performed, it is still necessary to select an optimum feature amount.

It is a further object of this invention to automatically select an optimum feature amount according to image processing technique.

In the image processing apparatus according to this invention, photographic image data comprising dot matrix picture elements is input, and predetermined image processing is performed. This image processing apparatus comprises an image data acquiring unit for acquiring the aforesaid photographic image data, an image processing indicator specifying unit for performing a predetermined summation processing on picture elements based on this acquired image data, and specifying an image processing indicator, and a processing unit for determining image processing contents based on the specified indicator, and performing image processing. The aforesaid image processing indicator specifying unit comprises an evaluation unit for obtaining a feature amount by inputting the aforesaid photographic data, summing the image data for all picture elements, and obtaining a feature amount according to plural predetermined evaluation criteria. In the aforesaid processing unit, the image data can be converted by plural techniques, and the feature amounts obtained in the aforesaid evaluation unit used according to the particular technique.

According to this invention, image data from a photographic image comprising dot matrix picture elements is input in this manner, and a feature amount is obtained according to plural evaluation criteria by summing image data for picture elements in the evaluation unit. In the processing unit, in converting the image data by plural techniques, the feature amounts obtained in the evaluation unit according to each technique are then used to convert the data depending on the technique.

Specifically, although there are cases where the image data is best converted using a feature amount centered on the object such as in light/dark correction, there are other cases where image data is better converted using a feature amount centered on the whole image such as when contrast is increased, and the image data conversion may be performed by suitably selecting these plural feature amounts.

According to this invention, when feature amounts are obtained according to plural evaluation criteria and image processing is performed by plural methods, the feature amounts used depend on the method, so image processing may be performed based on an optimum evaluation criterion.

When image data is converted, the feature amounts should be such that they can be used to identify the features of the image, and there is no need to specify the type of image. For example this also includes indicators such as luminance histograms which identify whether the image is to be considered as light or dark, there being no need to obtain the identification result that the image is light or dark. Apart from lightness, the indicator may of course specify whether or not the image is sharp, or it may be an indicator to identify vividness.

There is also no particular limitation on the way in which the evaluation unit and processing unit are applied. For example, assuming that plural image processing methods are used, plural feature amounts may be obtained and stored according to plural evaluation criteria, and the image data converted by suitably selecting the feature amount in the processing unit as necessary. As another example, image data for picture elements may be summed by a predetermined criterion in the evaluation unit so as to obtain a suitable feature amount on each occasion that image processing is performed in the aforesaid processing unit.

It will of course be understood that these plural image processing methods based on feature amounts obtained by plural different evaluation criteria, may also be applied not only to an actual device but also to a system both of which are then a valid form of the invention. When the image processing methods are implemented by software as specific examples of the concept of the invention, there naturally exist media on which the software is recorded which then offer all the attendant advantages thereof.

The evaluation criterion used to obtain feature amounts in the aforesaid evaluation unit will depend on the image processing that is to be performed, and while there are some cases where it is desirable to concentrate on the object for image processing, there are some cases where it is not as described above.

It is a further object of this invention to provide an example of the former case.

In the image processing apparatus according to this invention, the aforesaid evaluation unit comprises an evaluation unit wherein an object in a photographic image is sampled, and image data for picture elements of this object is summed to obtain a feature amount, and in the aforesaid processing unit, in one processing method, the feature amount obtained from object picture elements is used when the feature amount for the central part of the image data is used.

According to the invention thus comprised, when image data is converted based on the feature amount of the central part of the image data in the aforesaid processing unit, the object in the photographic image is sampled in the aforesaid evaluation unit, and the feature amount is obtained by summing image data for object picture elements according to predetermined criteria.

Herein, the central part of the image data has the following meaning. For example, when it is determined whether a given photograph is light or dark, it is easily appreciated that the determination can conveniently be based on the intermediate density of the image. This intermediate density may also be referred to as a median in a luminance distribution, i.e. the center of the luminance distribution, and in this sense it is referred to as the central part of the image data. Then, if there is an object in the photographic image, it may be said that there is a definite necessity to perform light/dark correction in line with the lightness of this object.

This invention is suitable for the case when image processing is performed based on the feature amount of the central part of the image data.

Any of the aforesaid techniques may be applied as the basic technique for sampling the object. As an example, in the aforesaid evaluation unit, picture elements for which there is a large variation of image data between adjacent picture elements are sampled as the object. When picture elements are aligned at a fixed interval apart as in the case of a dot matrix image, the difference of image data between adjacent picture elements is proportional to a first order differential. This difference may be determined as the image variation amount. In this case, the difference may be regarded as the magnitude of a vector, and the vectors constructed taking account of adjacent directions. If this is done it is sufficient to determine the difference of image data for adjacent picture elements, computing is easy, and the processing for determining the object is reduced.

As another example, in the aforesaid evaluation unit, picture elements for which the chromaticity is within a predetermined range may be sampled as the object. In this case, in the aforesaid evaluation unit, the chromaticity of picture elements is found. The chromaticity represents an absolute proportion of a color stimulation value, and it is not affected by lightness. Therefore the object in the image can be separated by possible range of chromaticity. For example, there is the chromaticity range for skin color, or the chromaticity range for the green of the trees. As this can be said for chromaticity, in the aforesaid evaluation unit, picture elements for which the chromaticity lies within a predetermined range are sampled as the object. In this way, an object can be determined by its chromaticity, and the object may be sampled without depending on the lightness or darkness of the object.

On the other hand as an example of image processing not concerned only with the object, the aforesaid evaluation unit comprises an evaluation criterion wherein picture elements of the aforesaid image data are uniformly sampled and summed so as to obtain a feature amount, and in the aforesaid processing unit, in one processing method, the feature amount obtained by the aforesaid uniform sampling is used when an average feature amount of the photographic image is used. In this case, when image data is converted based on the average feature amount in the aforesaid processing unit, the feature amount is obtained by uniformly sampling picture elements of the image data according to predetermined evaluation criteria. Of course, the summation may be performed on all picture elements of the photographic image, but it may be said that is no advantage as the processing amount increases. Hence, it is convenient to perform image processing based on the average feature amount of the photographic image, e.g. saturation correction.

As another example of image processing which is not concerned only with the object, the aforesaid evaluation unit comprises an evaluation criterion wherein picture elements of the aforesaid image data are uniformly sampled and summed to obtain a feature amount, and in the aforesaid processing unit, in one image processing method, the feature amount obtained by uniform sampling is used when the edges of a feature amount distribution of the photographic image are used. In this case, in the aforesaid processing unit, it is assumed that the ends of the feature amount distribution obtained in the aforesaid evaluation unit are used. For example, to increase the contrast, image processing is performed to find the luminance distribution, and the edges of this luminance distribution are widened, but if the luminance distribution of the object were used in this case, other highlighted parts appear white. Therefore in this case, in the aforesaid evaluation unit, picture elements of image data are uniformly sampled according to predetermined criteria, and summed to obtain the feature amount. This is suitable for image processing using the edges of a feature amount distribution in an actual photographic image, e.g. for increasing contrast.

In the above, a continuous sequence of processes is performed comprising predetermined analysis of the image and image processing by specifying image processing indicators, but the analysis result itself is also useful.

It is a further object of this invention to provide an image evaluation device wherein it is easier to use an image evaluation result which is an analysis result done.

In the image evaluation device offered by this invention, photographic image data comprising dot matrix picture elements is input, the image data for all picture elements is summed according to predetermined criteria, and is the image evaluation device which is based summation result, and evaluate image, and the image is evaluated based on the summation results. There are plural evaluation criteria for the aforesaid summation results, and the evaluation results are combined with a predetermined weighting based on these evaluation criteria.

According to the invention as thus comprised, the evaluation method assumes that photographic image data comprising dot matrix picture elements is input, the image data is summed for picture elements, and the image is evaluated based on the summation results. Herein, there are plural evaluation criteria for these summation results, and the evaluation results are combined with a predetermined weighting based on the evaluation criteria.

In other words, although some evaluation criteria are suitable for evaluating images where a sharp image is the object such as in the case of portrait, other criteria are suitable for evaluating images where the background is the important object. A general evaluation may be made by suitably combining plural evaluation criteria in parallel and varying the weightings.

As described hereabove, as this invention gives a general evaluation by varying the weightings of plural evaluation criteria, it provides an image evaluating device which can be flexibly adapted to image feature determination.

Naturally, the concept of this invention for image evaluation by the above techniques comprises many forms. Specifically, it comprises hardware and software, various modifications being possible as may be convenient. When the concept of the invention is implemented by image processing software, there naturally exist recording media on which the software is recorded which can be used to perform the function of the invention. Moreover, these image evaluating techniques may be applied to an image evaluating device and its system running on software media.

Various techniques may be employed to achieve the same object in applying plural evaluation criteria to summation results. For example, all picture elements may be summed by weighting with different evaluation criteria, but it will be appreciated a large amount of processing is involved when the summation is applied to all picture elements. Hence, as described above, the picture elements are first sampled based on plural evaluation criteria, summed, and the summation results combined with a predetermined weighting. In this case, the image data are sampled prior to summation, plural criteria are used by varying the criteria applied to the sampling, and the weighting of the summation results is then adjusted before combination. An evaluation can therefore be made with different weightings on the results based on plural evaluation criteria. Due to this sampling of image data, plural evaluation criteria maybe employed according to the sampling method.

As one evaluation criterion, the data may of course be sampled uniformly and summed. In this case, the image data is uniformly thinned and the whole image is considered, which makes this a suitable criterion for determining scenic photographs, etc. In this way an optimum criterion can be used while reducing the processing amount.

As an example of a criterion which can be applied whether or not sampling is used, is the evaluation of picture elements which have a large variation relative to adjacent picture elements with a heavier weighting. In this case, the image variation of picture elements from adjacent elements is detected, and clear image parts with a large variation are given a heavier weighting in the summation. If this is done, as image parts with a large variation are often parts of the photograph which are clearly in focus, an image evaluation which weights important parts of the image can be performed.

This criterion places more emphasis on the sharp parts of the image, and it is therefore naturally suitable for the determination of human images. Herein, image parts with a large variation may be evaluated either by introducing weighting as the picture elements are summed, or by summing only picture elements with a large variation. The weighting used in the evaluation is not necessarily fixed, but may also be allowed to vary according to the criterion. In this case, by varying the weighting for different evaluation criteria, an overall evaluation result for the image can be deduced. Moreover various approaches are possible, e.g. weightings may be varied individually so as to generate plural combinations which are then selected. In this way, by modifying the weighting for plural criteria, a more flexible evaluation can be made.

Instead of an operator varying the weighting, this can be done based on the image data itself. As an example of this, the weighting of the evaluation results may be varied based on the criteria. In this case, results are obtained according to various criteria, and the weighting is modified in view of the suitability of the criteria in the light of the results. As the results are used to vary the weighting, the work involved in the evaluation is less.

Various techniques may also be used to modify the weighting of the criteria using the results. For example, if it is determined whether or not the image data for picture elements should be sampled according to one criterion, the number of these picture elements may be taken as a criterion and the weighting increased when the number of picture elements is large.

BRIEF DESCRIPTION OF THE DRAWINGS

FIG. 16 is a diagram showing a conversion table for widening the luminance distribution.

FIG. 17 is a diagram showing the general concept of brightening by γ correction.

FIG. 18 is a diagram showing the general concept of darkening by γ correction.

FIG. 28 is a diagram showing a sampling frequency.

FIGS. 30(a)-(c) are diagrams showing a relation between an image to be converted and picture elements for sampling.

FIG. 33 is a diagram showing an example of block weighting.

FIG. 34 is a diagram showing another example of block weighting.

FIGS. 37(a)-(f) are diagrams showing an example of a filter for computing the edginess amount.

DESCRIPTION OF THE PREFERRED EMBODIMENTS

Some preferred embodiments of this invention will now be described.

Embodiment 1

First, a description will be given of one form of image processor comprising an image processing indicator specifying unit which comprises an object determining unit, and automatically determines an object as picture elements having a large variation Conventionally, this determination had to be performed by a human operator.

Figure 1:
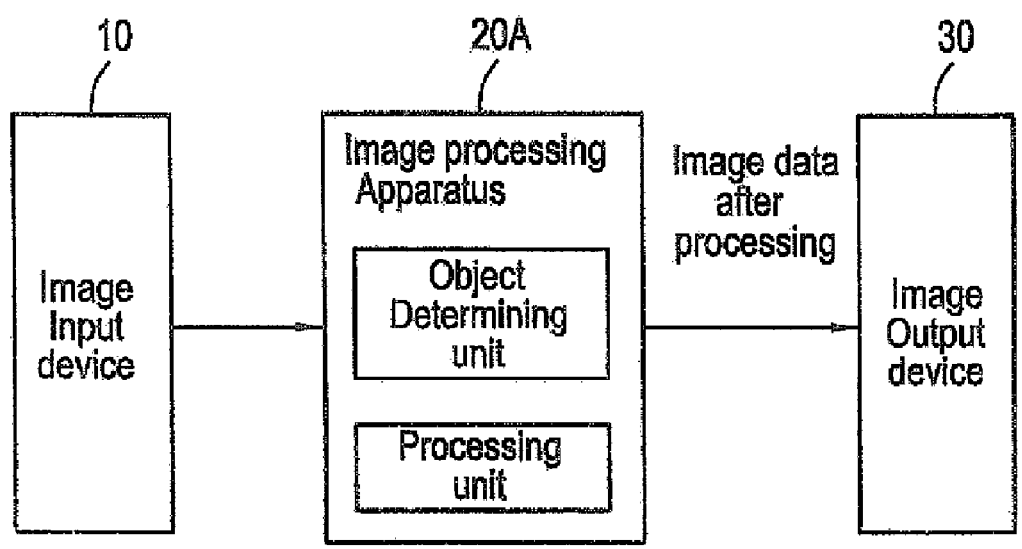
FIG. 1 is a block diagram of an image processing system in which an image processing apparatus according to one embodiment of this invention is applied.
Figure 2:
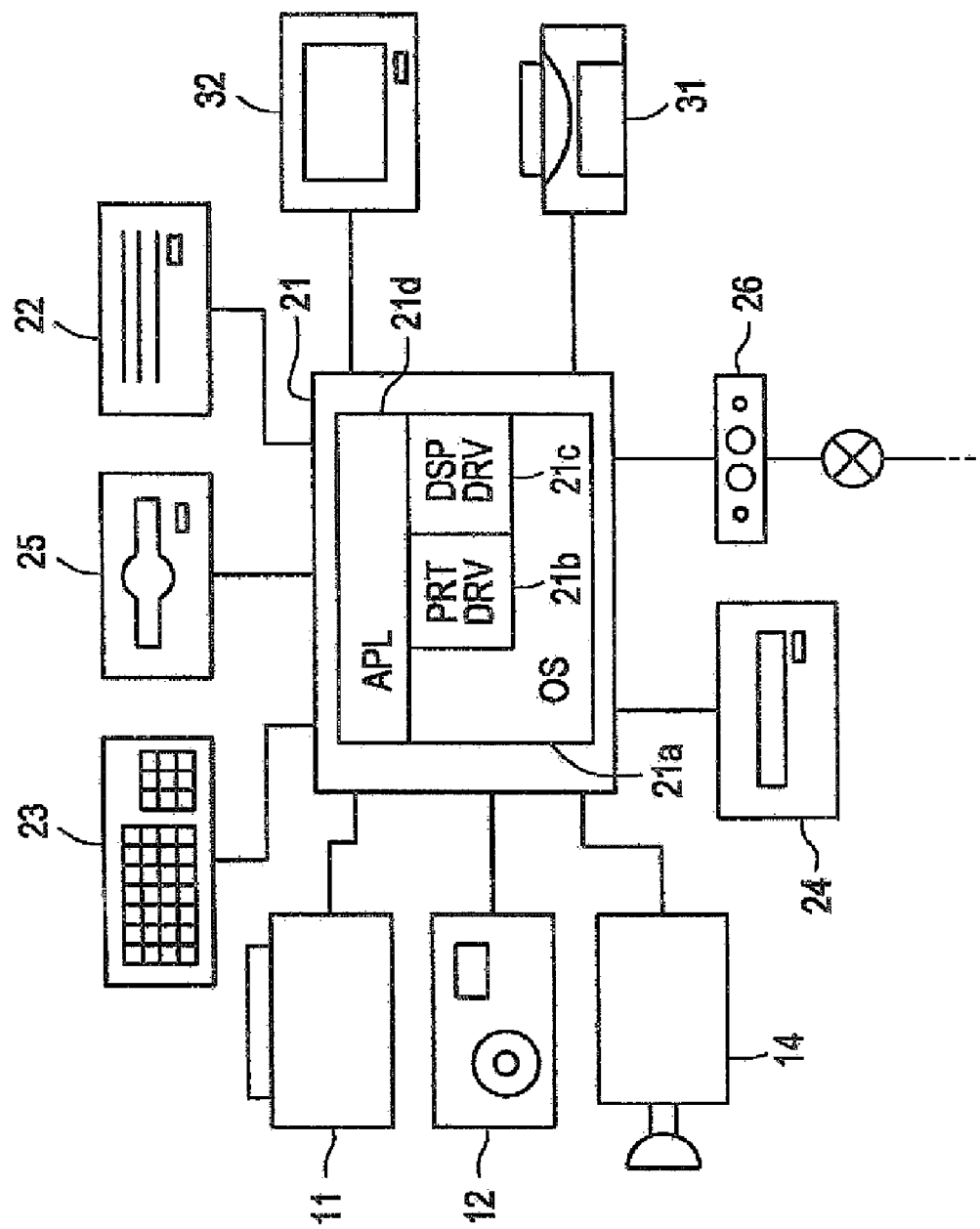
FIG. 2 is a block diagram of the actual hardware of the image processing apparatus.

FIG. 1 shows a block diagram of an image processing system to which an image processing apparatus according to one embodiment of this invention is applied. FIG. 2 shows an example of the actual hardware construction by a schematic block diagram.

In FIG. 1, an image reader 10 outputs photographic image data which represented photographs as dot matrix picture elements to an image processing apparatus 20A. The image processing apparatus 20A determines the contents and extent of image processing, and then performs the processing. The image processing apparatus 20A outputs the processed image data to the image output apparatus 30, and the image output apparatus 30 outputs the processed image as dot matrix picture elements. From the image data output by the image processing apparatus 20A, an image variation amount is found for each picture element, and picture elements having a large variation amount are determined to be those of the object. The content and extent of image processing are determined, and image processing is performed in line with this object image data. Therefore, the image processing apparatus 20A comprises an object determining unit which finds an image variation amount in each picture element and determines picture elements having a large variation amount as the object, and processing unit which determines the content and extent of image processing in line with object image data.

A scanner 11 in FIG. 2 and digital still camera 12 or video camera 14 correspond to a specific example of the image reader 10, the computer system corresponds to a specific example of the image processing apparatus 20A comprising a computer 21, hard disk 22, keyboard 23, CD-ROM drive 24, floppy disk drive 25 and modem 26, and the printer 31 and display 32 correspond to specific examples of the image output apparatus 30. In case of this embodiment, the object is found to perform appropriate image processing, so photographic data such as photographs are suitable as image data. A modem 26 is connected to the public telecommunication line, and to an external network via the public telecommunication line through which software and data can be downloaded.

According to this embodiment, the scanner 11 and digital still camera 12 which function as the image reader 10 output RGB (red, green, blue) gradation data. The printer 31 which is the image output apparatus 30 requires input of CMY (cyan, magenta, yellow) or CMYK (to which black is added) as gradation data, and the display 32 requires RGB gradation data as input. Also, an operating system 21a runs on the computer 21. A printer driver 21b corresponding to the printer 31 and display driver 21c for the display 32 are built in. Processing is controlled by the operating system 21a, and an image processing application 21d performs predetermined image processing together with the printer driver 21b and display driver 21c when necessary. Therefore, the specific role of this computer 21 which functions as the image processing apparatus 20A is to input RGB gradation data, generate RGB gradation data for optimum image processing, display the data on the display 32 via the display driver 21c, convert the data to CMY (or CMYK) binary data via the printer driver 21b, and print it on the printer 31.

Figure 3:
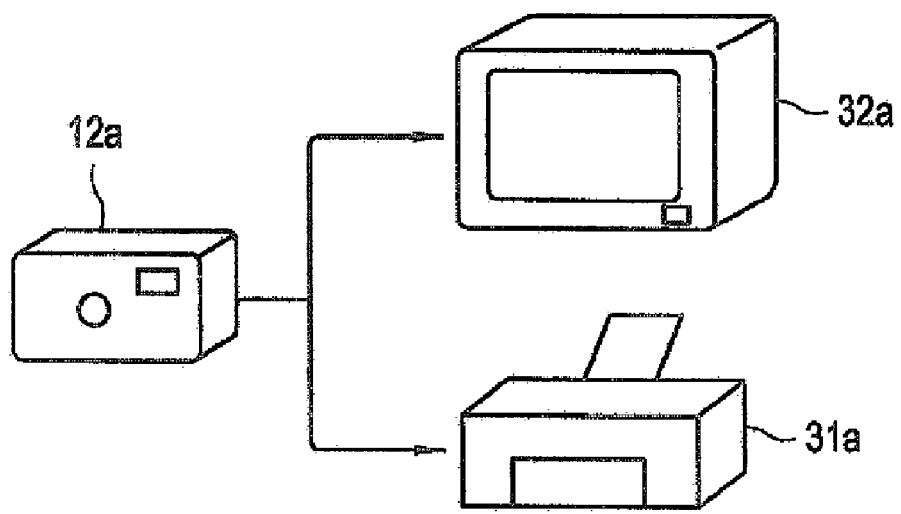
FIG. 3 is a block diagram showing another application example of the image processing apparatus of this invention
Figure 4:
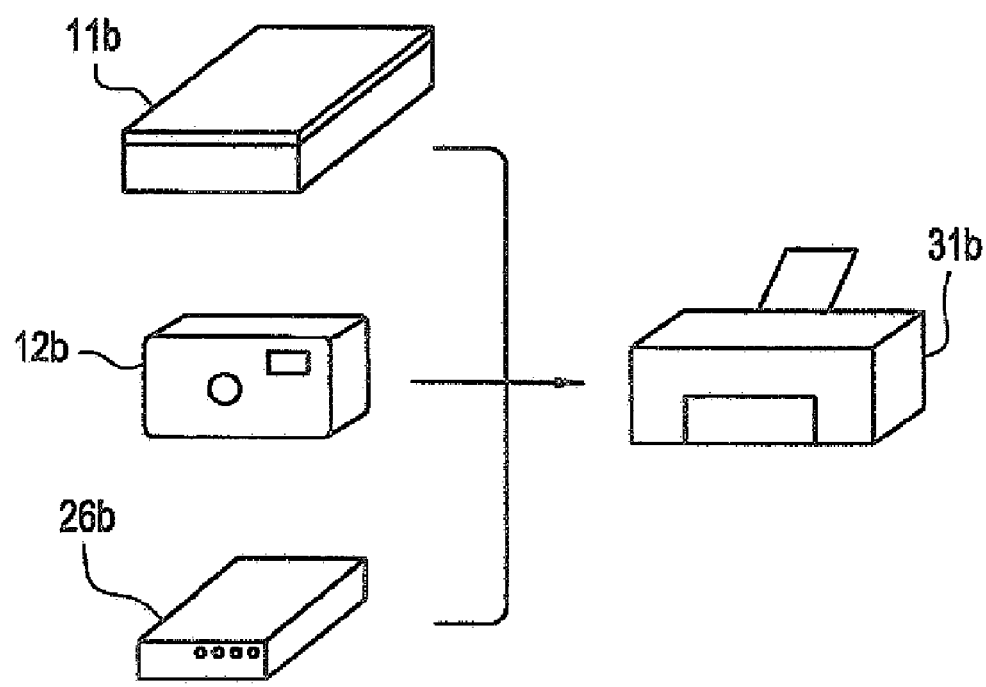
FIG. 4 is a block diagram showing another application example of the image processing apparatus of this invention.

In this way, according to this embodiment of the invention, a computer is interposed between the input-output apparatus to perform image processing, but a computer is not absolutely necessary if the system is capable of performing various types of image processing on image data. For example the system may be such that the image processing apparatus which determines the object and performs image processing is built into the digital camera 12a as shown in FIG. 3. The image is displayed on a display 32a and printed by a printer 31a using converted image data. Alternatively, the object is determined and image processing is performed automatically from image data input via a scanner 11b and digital still camera 12b or modem 26b, as shown in FIG. 4.

Figure 5:
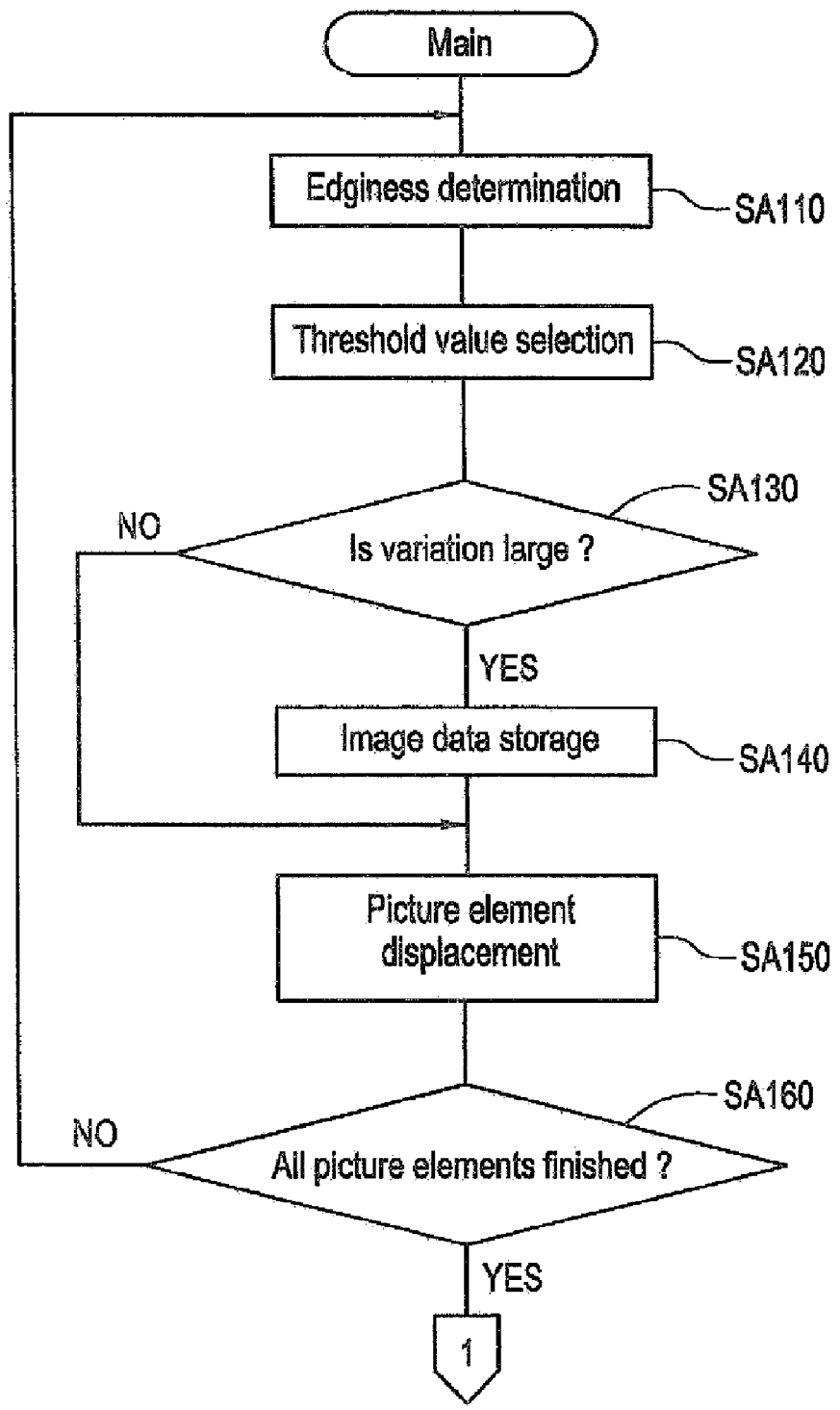
FIG. 5 is a flowchart showing a front stage of main processing in an image processing apparatus according to this invention.

The aforesaid determination of the object and image processing are performed by an image processing program corresponding to a flowchart shown by FIG. 5 which is built into the computer 21. In the flowchart shown in the figure, it is determined whether or not the image is that of the object.

Figure 6:
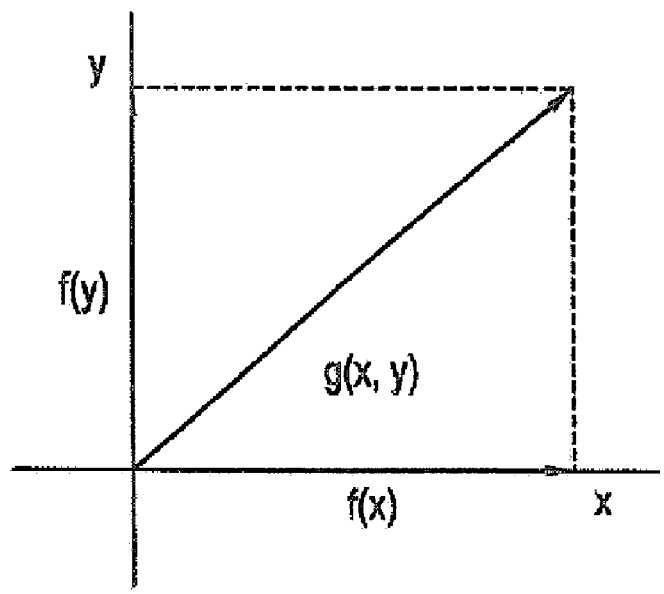
FIG. 6 is an illustration showing a case where an image variation amount is expressed by component values in orthogonal coordinates.
Figure 7:
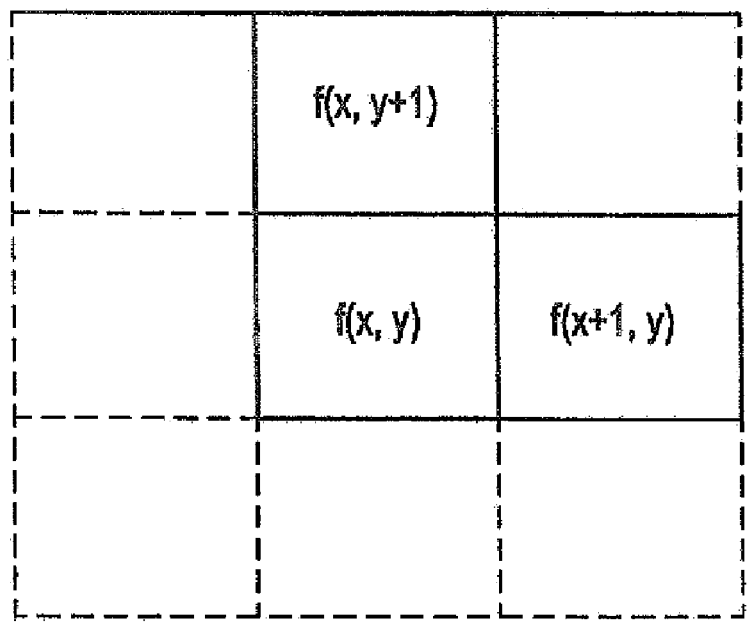
FIG. 7 is an illustration showing a case where an image variation amount is expressed by a differential value in adjacent picture elements in a vertical axis direction and a horizontal axis direction.

According to this invention, picture elements for which the image is sharp are determined to be those of the object based on the experimental fact that the image is sharper for the object than for other parts. When image data comprises dot matrix picture elements, gradation data is displayed showing RGB luminance for each picture element, and a difference amount between data for adjacent picture elements becomes large at the edge of the image. This difference amount is a luminance gradient, and is referred to as edginess. In a step SA110, the edginess of each picture element is determined. When the XY orthogonal coordinate system is considered in FIG. 6, vectors of the image variation amount may be computed if the X-axis direction component and Y axis direction component are found respectively. For a digital image comprising dot matrix picture elements, assume that there are adjacent picture elements in the vertical axis direction and horizontal axis direction as shown in FIG. 7, and assume that the luminance is expressed as f(x, y) In this case f(x, y) is R(x, y), G(x, y), B(x, y) which is the luminance of each of the colors RGB, or it maybe a total luminance Y(x, y). Strictly speaking, the relation between R(x, y), G (x, y), B (x, y) which is the luminance of each of the colors RGB, and total luminance Y(x, Y), cannot be converted without referring to color conversion charts, but a simple correspondence relation can be utilized as described hereafter. As shown in FIG. 7, a difference amount value fx in the X direction and a difference amount value fy in the Y direction may be written:

$$fx = f(x+1, y) - f(x, y) \qquad (1)$$

$$fy = f(x, y+1) - f(x, y) \qquad (2)$$

Therefore the magnitude of the vector |g (X, y)| having these differences as components may be written:

$$|g(x,y)| = (fx^{}2 + fy^{}2)^{**}(1/2) \qquad (3)$$

Edginess is of course represented by |g(x, y)|. The picture elements are actually arranged in length and breadth as a grid shown in FIG. 8, there being eight picture elements in the center. Therefore, expressing a difference amount of image data between adjacent picture elements as a vector, the sum of this vector may be taken as the image variation amount.

As the edginess may be found for each picture element in this way, picture elements having a large edginess when compared with a threshold value may be determined to be object picture elements. However from actual experience, the object is often situated in the center of the figure. This fact provides proof that the use of an arrangement where a large number of picture elements are sampled from the center area for image processing, gives satisfactory results.

Figures 8, 9:
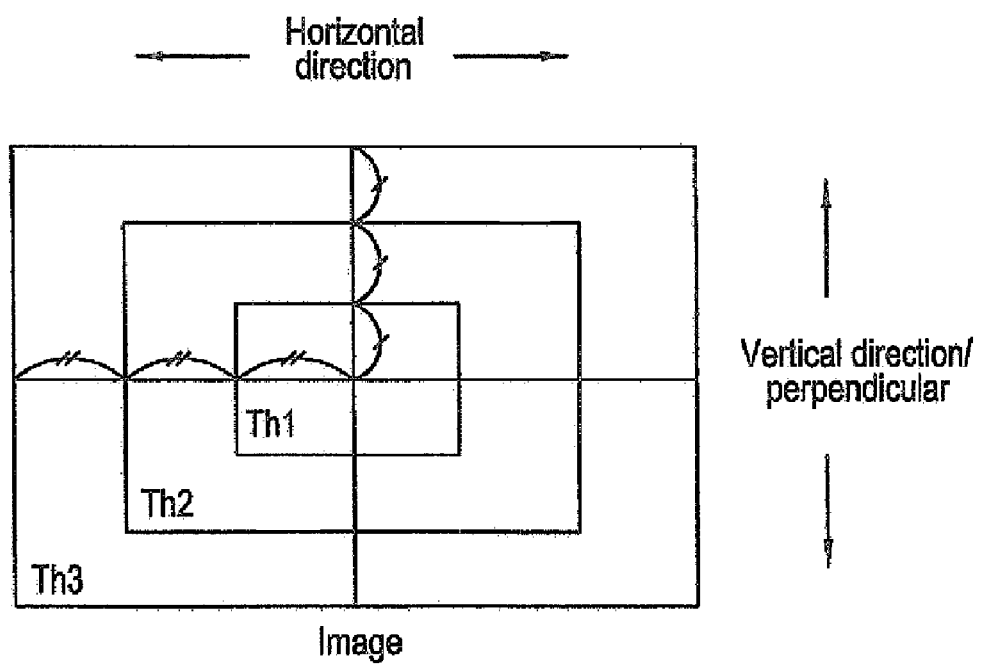
FIG. 8 is an illustration showing a case when an image variation is calculated between adjacent picture elements.
FIG. 9 is a diagram showing a region wherein a threshold value is varied.

For this reason, the threshold values Th1, Th2, Th3 used for comparison in each part of the center of the image are arranged to be different as shown in FIG. 9. In this example, of course, the relation $$Th1 < Th2 < Th3 \qquad (4)$$

holds. The threshold value is lower the nearer the center, and this area is determined to be the object even if the edginess is relatively low.

As the threshold value varies as shown in the figure, the area is divided uniformly into three equal parts in the horizontal and vertical directions from the center of the image. In a step SA120, the threshold value used for comparison is determined based on the area in which the picture element used for edginess determination is located. The threshold value is compared with the edginess in a step SA130, and it is determined whether or not the variation amount is large. As a result of this comparison, if the edginess is large, it is determined that this picture element is a picture element of the object, and image data of the picture element is stored in a work area in a step SA140. The work area may be a RAM in the computer 21, or the hard disk 22.

The above processing is performed for each picture element of image data. In a step SA150, the picture element to be processed is displaced, and processing is repeated until it is determined that processing has been completed in a step SA160.

Figure 10:
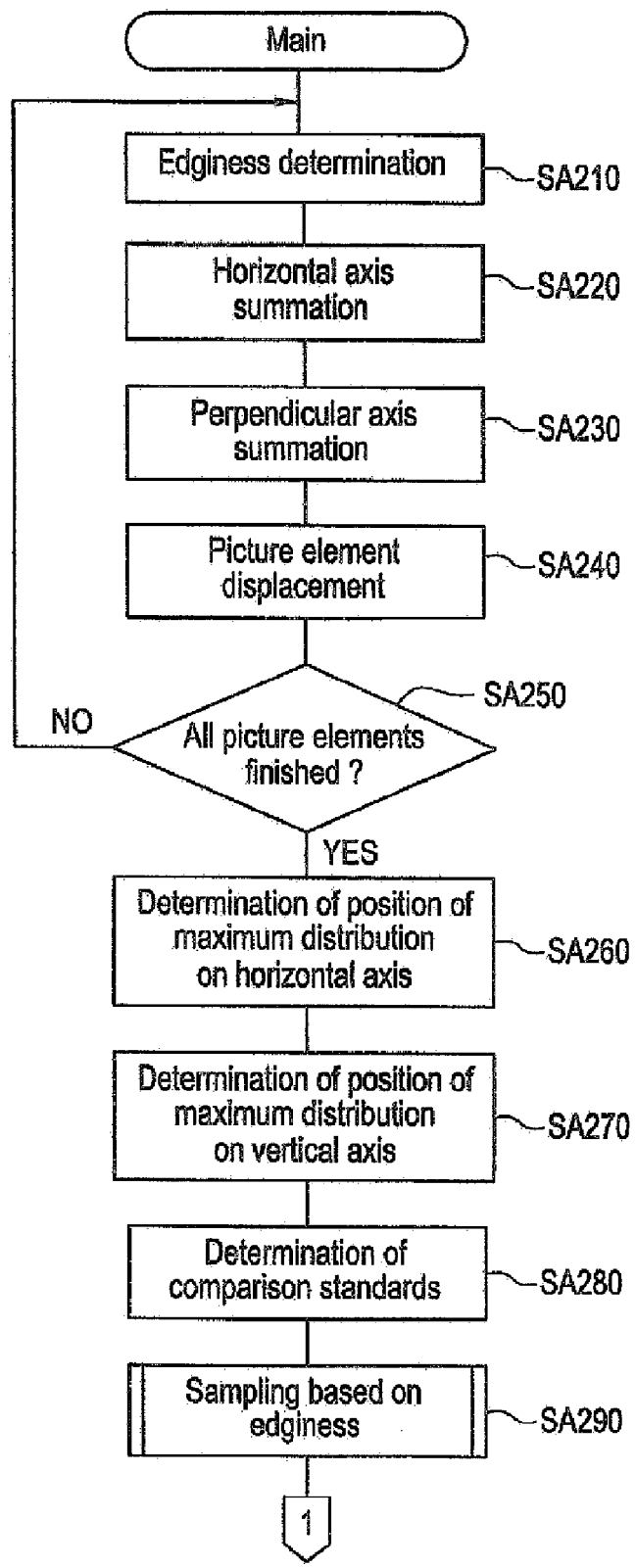
FIG. 10 is a flowchart for automatic division of regions.
Figure 11:
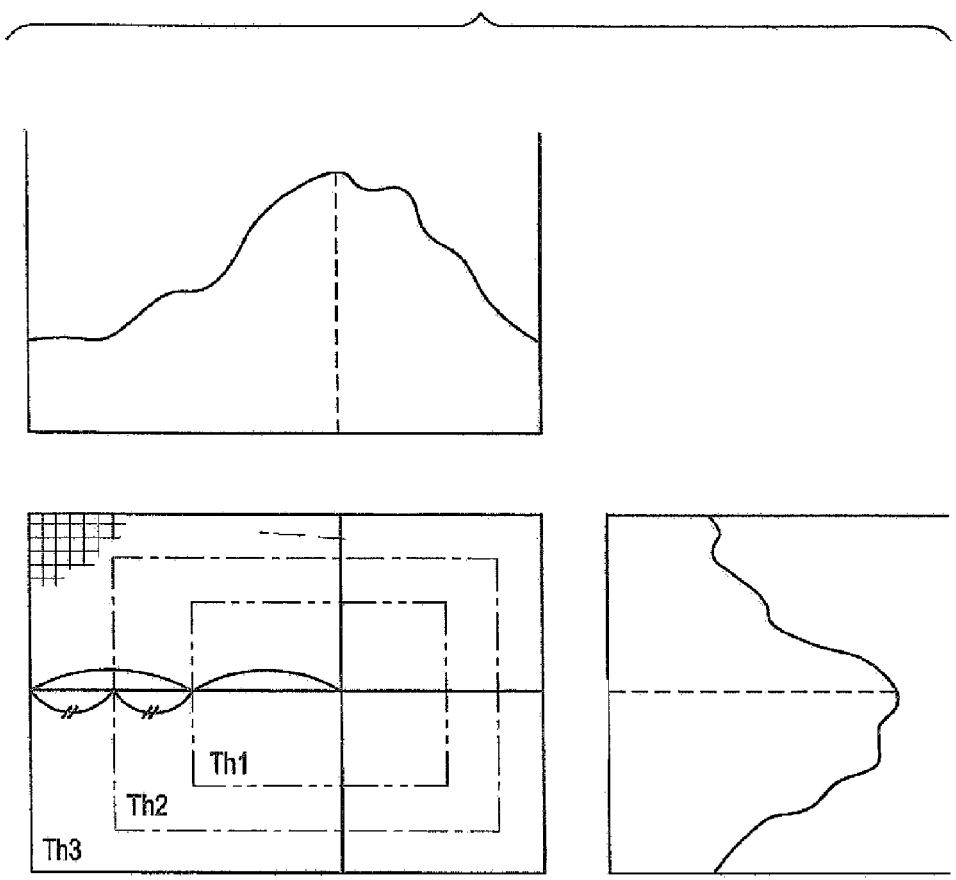
FIG. 11 is a diagram showing a region setting.

In the embodiment described above, the area division for modifying the threshold value was always based on the central part of the image, but the area division may also be varied based on the edginess distribution. FIG. 10 is a flowchart for suitably varying the area division, and FIG. 11 shows the areas so divided.

In this case also, subsequent processing is performed on each picture element while moving the picture element to be processed in the same way as above. After the aforesaid edginess was determined in a step SA210, it is summed in the horizontal axis direction in a step SA220, and summed in the vertical axis direction in a step SA230. Picture elements to be processed are displaced in a step SA240, and the process loops until it is determined in a step SA250 that processing for all picture elements is complete.

After summation is completed for the horizontal axis direction and vertical axis direction, a maximum distribution position on the horizontal axis is determined in a step SA260, and a maximum distribution position on the vertical axis is determined in a step SA270. As shown in FIG. 11, a high edginess part along the horizontal and vertical axis direction is regarded as the center of the image, the area being divided as follows.

The distance to an end from the center is divided in half in the vertical direction and the horizontal direction. The threshold value is Th1 for the inside, the remaining distance being divided in half with a threshold value Th2 for the inner area and a threshold value Th3 for the outer area. In a step SA280, by dividing the area as described above, comparison criteria are determined, and in a step SA290, object picture elements are determined by perform sampling based on edginess by the same processing as that of the steps SA110-SA160 mentioned above according to the correspondence between this area and threshold value.

In this example, after finding the center area, the area was divided into two equal parts in the directions of both the horizontal axis and vertical axis, but the area may also be divided in other ways, e.g. based on the edginess distribution. The actual area division may be suitably varied.

Figure 12:
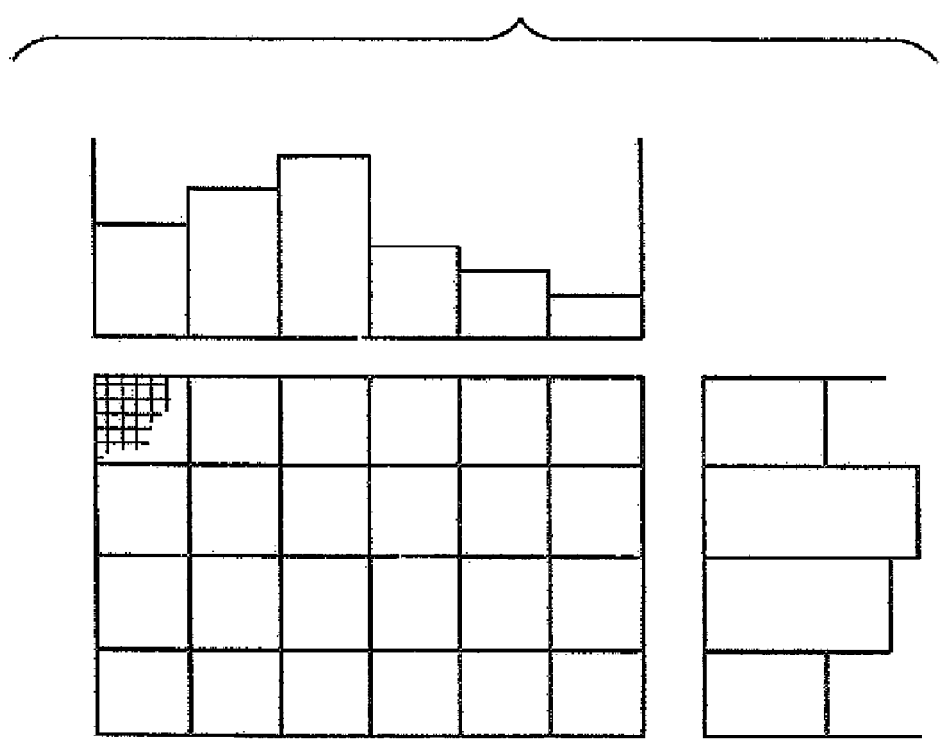
FIG. 12 is a diagram showing this region setting in a modified example.

For example, in the example stated above, summation in the horizontal axis direction and vertical axis direction were performed in picture element units, but the image may be divided into a relatively larger grid as shown in FIG. 12. The summation may then be made in these grid units, the position of the maximum distribution determined, and area division performed.

Figure 13:
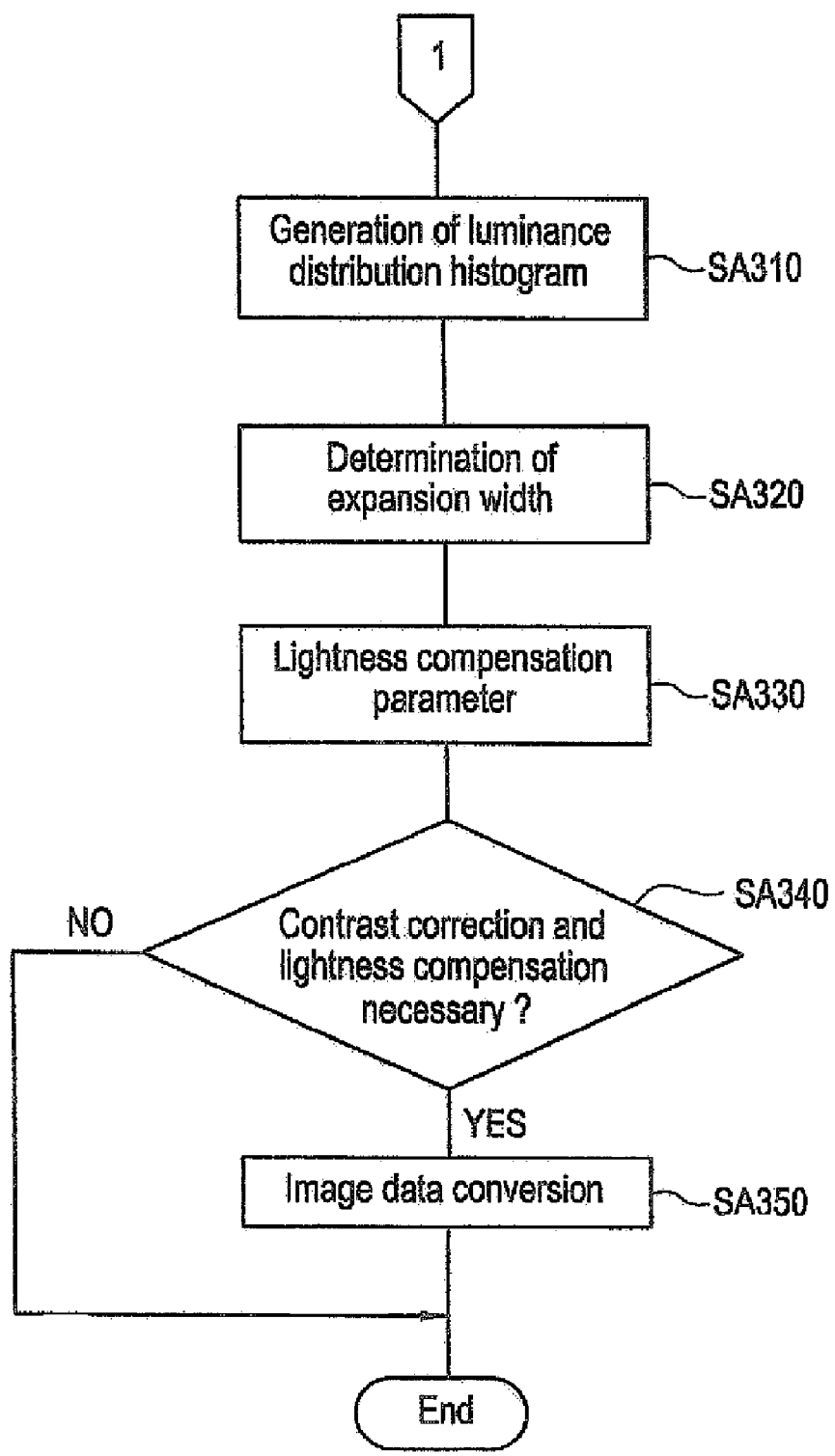
FIG. 13 is a flowchart showing the latter half of main processing.

If object picture elements can be sampled in this way, the optimum image processing can be determined and performed based on image data for these picture elements. FIG. 13 is a flowchart showing increase of contrast and lightness compensation as an example.

In the basic technique to increase contrast according to this embodiment, a luminance distribution is found based on object image data, and if this luminance distribution uses only part of the original gradation (255 gradations), the distribution is expanded.

Figure 14:
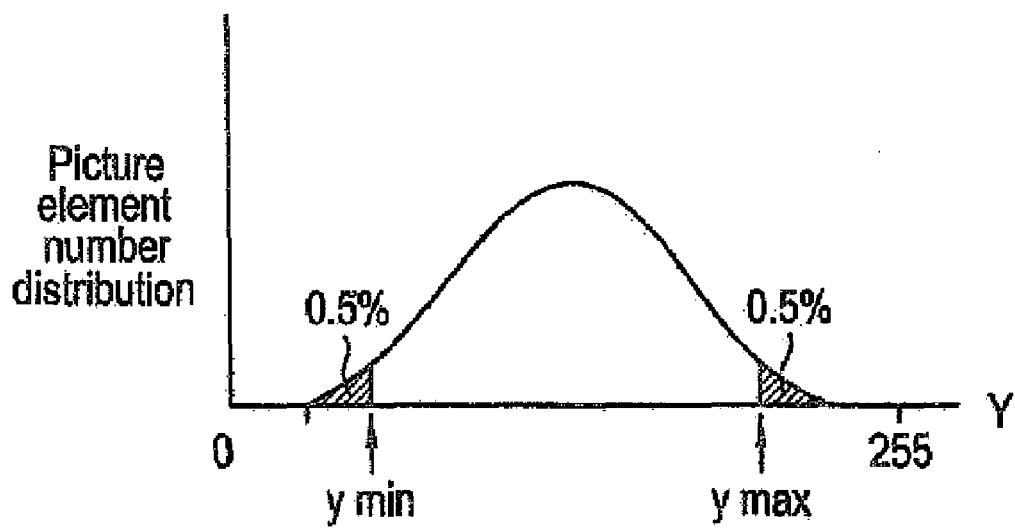
FIG. 14 is a diagram showing the edges obtained by luminance distribution edge processing and edge processing.

Therefore, a histogram of luminance distribution is generated in a step SA310, and an expansion width is determined in a step SA320. When the expansion width is determined, both ends of the luminance distribution are found. A luminance distribution of a photographic image is generally like a hump as shown in FIG. 14. The distribution may of course have various positions and shapes. The width of the luminance distribution is determined by where the two ends are located, but the points where the distribution number is "0" where the distribution slopes away cannot be taken as the ends. There is a case where the distribution number varies in the vicinity of "0" in the lower sloping part. This is because from a statistical viewpoint, it changes without limit as it approaches "0".

Therefore, the two ends of the distribution are taken to be a part in the distribution shifted somewhere towards the inside by a certain distribution fraction from the brightest side and the least bright side. In the area in this embodiment, this distribution fraction is set to 0.5%, but the fraction may be modified as deemed appropriate. In this way, white spots and black spots due to noise can also be ignored by cutting the upper and lower ends by a certain distribution fraction. Specifically, if such processing is not performed and there are white spots or black spots, these become the two ends of the luminance distribution. In a 255 gradation luminance value distribution, the lower end is usually "0" and the upper limit is "255", but the above problem is avoided by considering the end of the distribution to be a point situated at 0.5% from the end in terms of picture elements.

In the actual processing, 0.5% of the number of picture elements sampled as the object is computed, the distribution numbers are summed towards the inside in sequence from the luminance value at the upper end and the luminance value at the lower end in a reproducible luminance distribution, and the luminance value corresponding to 0.5% is determined? Hereafter, the upper limit will be referred to as ymax and the lower limit as ymin.

When the reproducible range of luminance is "0"-"255", the luminance Y converted from the luminance y before conversion, and the maximum value ymax and minimum value ymin of the luminance distribution, is given by the following equations:

$$Y = ay + b \tag{5}$$

$$\text{where } a = 255/(y\text{max} - y\text{min}) \tag{6}$$

$$b = -a \cdot y\text{min or } 255 - a \cdot y\text{max} \tag{7}$$

Figure 15:
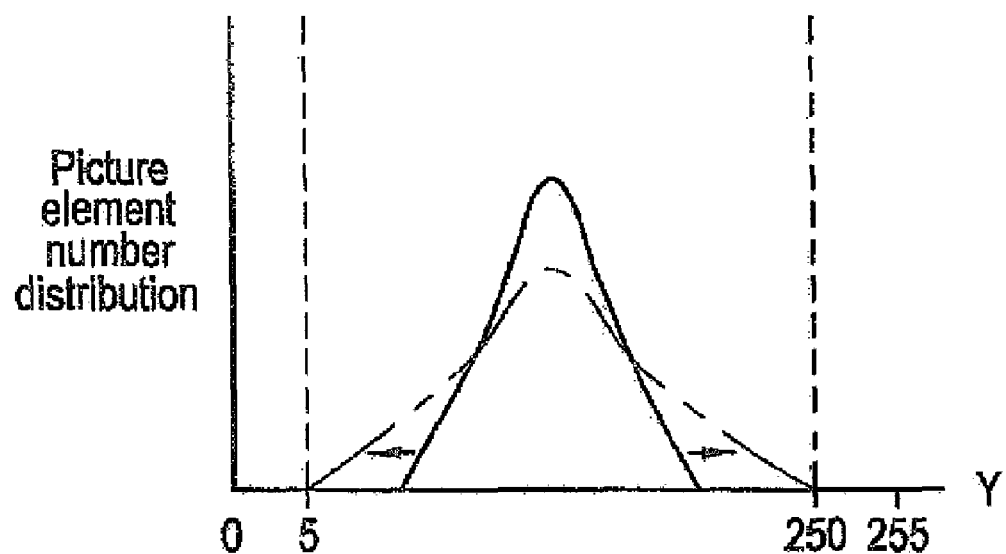
FIG. 15 is a diagram showing widening of a luminance distribution and a reproducible luminance range.

In the above equation, when Y<0, Y is set equal to 0, and when Y>255, Y is set equal to 255. a is a slope and b is an offset. According to this conversion equation, a luminance distribution having a certain narrow width can be enlarged to a reproducible range, as shown in FIG. 15. However, when the reproducible range was increased to the maximum to expand the luminance distribution, highlighted areas are white and high shadow areas come out black. To prevent this, according to this embodiment, the reproducible range is limited, i.e. a luminance value of "5" is left as a range which is not expanded at the upper and lower ends of the reproducible range. As a result, the parameters of the conversion equation are given by the following equations:

$$A = 245/(y\text{max} - y\text{min}) \tag{8}$$

$$B = 5 - a/y\text{min or } 250 - a/y\text{max} \tag{9}$$

In this case, in the ranges y<ymin and y>ymax, conversion is not performed.

However, if this expansion factor (corresponding to a) is applied, a very large expansion factor may be obtained. For example at dusk, although the width of contrast from the brightest to the darkest part is naturally narrow, if the contrast of such an image were considerably increased, it would appear to be converted to a daytime image. As such a conversion is not desired, a limit is imposed on the increase factor so that it is equal to or greater than 1.5 (−2). Due to this, dusk correctly appears as dusk. In this case, processing is performed so that the center position of the luminance distribution does not vary.

However, in luminance conversion, it is unreasonable to perform the aforesaid conversion (Y=ay+b) on every occasion. This is because the luminance y can only lie within the range "0" to "255", and the luminance Y after conversion can be found for all possible values of y beforehand. These can therefore be stored in a table such as is shown in FIG. 16.

This conversion table corresponds to the expansion width determination processing of the step SA320, and it allows image data to be converted. However, as it is very useful not only to emphasize contrast by increasing the luminance range but also to adjust luminance at the same time, the luminance of the image is determined in a step SA330 and a correction parameter is generated.

For example, the hump of the luminance distribution may be displaced to the side which is brighter overall as shown by the dotted line in FIG. 17 when the hump is nearer dark as shown by the solid line in the figure. Conversely, the hump of the luminance distribution may be displaced to the side which is darker overall as shown by the dotted line in FIG. 18 when the hump is nearer bright on the whole as shown by the solid line in the figure.

By performing various experiments, according to this embodiment, a Median ymed in the luminance distribution is found. When the median ymed is less than "85", the image is determined to be dark, and is lightened by a γ correction corresponding to the following γ value:

$$\gamma = y\text{med}/85 \tag{10}$$

or $$\gamma = (y\text{med}/85)^{**}(1/2) \tag{11}$$

In this case even if γ<0.7, γ is set equal to 0.7. If such a limit is not provided, a night scene appears as if it is in daylight. If the image is made too light, it becomes too white and contrast tends to be too low, hence it is preferable to perform processing such as emphasis in conjunction with saturation.

On the other hand, when the median ymed is greater than "128", the image is determined to be a light image and is darkened by a γ correction corresponding to the following γ value:

$$\gamma = y\text{med}/128 \tag{12}$$

or $$\gamma = (y\text{med}/128)^{**}(1/2) \tag{13}$$

In this case even if γ>1.3, γ is set equal to 1.3 so that the image does not become too dark.

Figure 19:
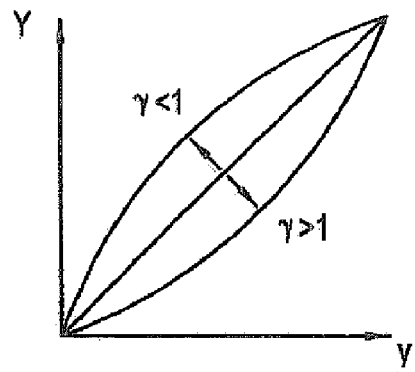
FIG. 19 is a diagram showing a correspondence relation for luminance modified by γ correction.

This γ correction may be applied to the luminance distribution before conversion, or to the luminance distribution after conversion. Correspondence relations for γ correction are shown in FIG. 19. When γ<1, the curve bulges upwards, whereas when γ>1, the curve bulges downwards. Of course, the result of this γ may also be reflected in the table shown in FIG. 16, and the same correction may be applied to table data.

Finally, in a step SA340, it is determined whether or not contrast correction and lightness compensation are necessary. In this determination, the aforesaid expansion factor (a) and γ value are compared with suitable threshold values, and when the expansion factor is large and the γ value exceeds a predetermined range, it is determined that such correction is necessary. If it is determined to be necessary, conversion of image data is performed. Specifically, the need for image processing and its extent are assessed in the steps SA310-SA340, and the required image processing is performed in the a SA350. The processing unit to accomplish this comprises hardware and software.

Conversion on the basis of equation (5) is performed when it is determined that image processing is necessary. This equation may also be applied to correspondence relations between RGB component values. The component values after conversion (R, G, B) relative to the component values before conversion (R0, G0, B0) may be found from:

$$R = a \cdot R0 + b \tag{14}$$

$$G = a \cdot G0 + b \tag{15}$$

$$B = a \cdot B0 + b \tag{16}$$

Herein, the RGB component values (R0, G0, B0), (R, G, B) have the same range when the luminance y, Y has the gradation "0" "255", so the aforesaid conversion table of luminance y, Y may be used without modification.

Therefore, the conversion table corresponding to equations (14)-(16) is referred to for the image data (R0, G0, B0) for all picture elements in a step SA350, and the process for obtaining the image data (R, G, B) after conversion is repeated.

In this processing unit, the determination is performed only for contrast correction and lightness compensation, but specific examples of image processing are not limited to this.

Figure 20:
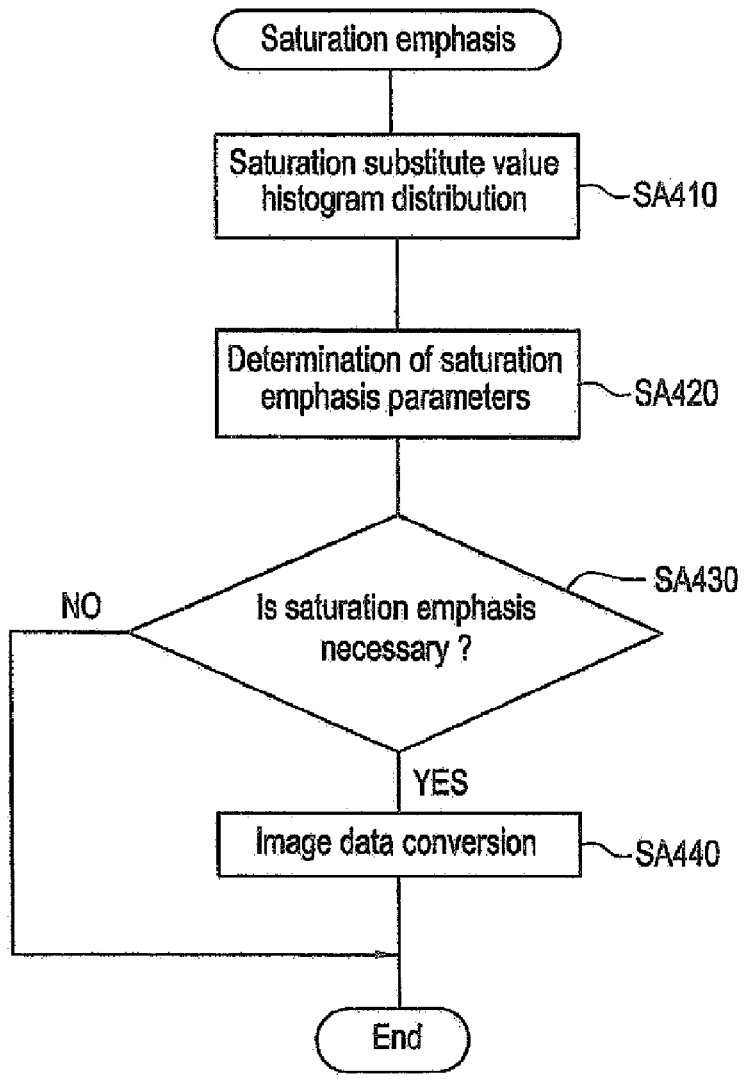
FIG. 20 is a flowchart showing a case when saturation is emphasized in the latter part of main processing.

FIG. 20 shows a flowchart for performing image processing for saturation emphasis.

First, it the object and determined picture element data have saturation as a component element, a distribution may be found using saturation values. However, as the data comprises only RGB component values, saturation values cannot be obtained unless they are converted to a color specification space which comprises direct component values? For example, in a Luv space which is a colorimetric system, the L axis represents luminance (lightness), and hues are represented by the U axis and V axis. Herein, as the distance from the intersection point of the U axis and V axis shows saturation, the saturation is effectively $(U^{}2+V^{}2)^{**}(1/2)$.

Such a color conversion between different color specification spaces requires an interpolation to be performed while referring to a color conversion table which stores correspondence relationships, and the computation amount is enormous. In view of this, according to this embodiment, standard RGB gradation data is utilized directly as image data, and saturation substitute values X are found as follows:

$$X=|G+B-2\times R| \tag{17}$$

Actually, the saturation is "0" when R=G=B, and is a maximum value either for any of the single colors RGB or for a mixture of two colors in a predetermined proportion. Due to this, it is possible to appropriately represent saturation directly. For yellow which is a mixture of the color red with green and blue, from the simple equation (17), the maximum saturation value is obtained, and when the components are equal, this is "0". For green or blue alone, about half the maximum value is attained. Of course, substitutions may be made using the equations:

$$X'=|R+B-2\times G| \tag{18}$$

$$X''=|G+R-2\times B| \tag{19}$$

Figure 21:
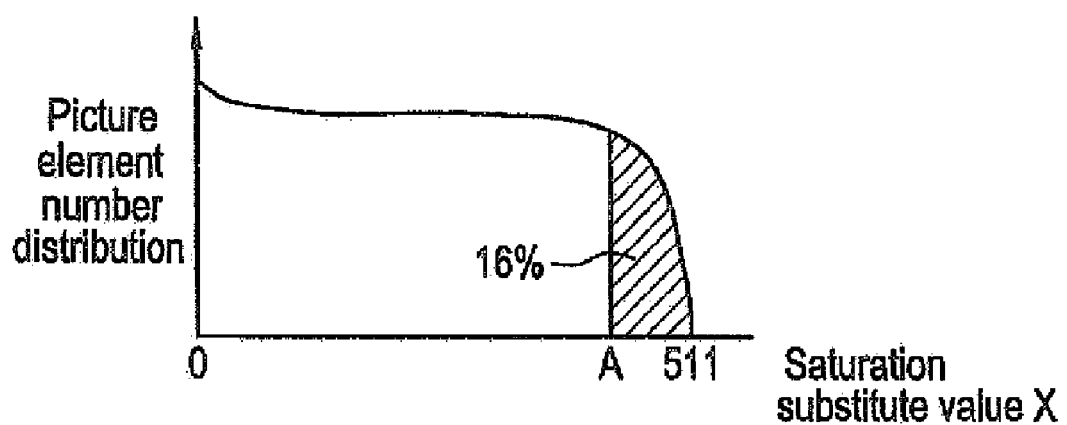
FIG. 21 is a schematic view of a summation state of a saturation distribution.

In a step SA410, a histogram distribution is found for the saturation substitution value X. In equation (17), saturation is distributed in the range of minimum value "0"-maximum "511", and the distribution obtained is approximately as shown in FIG. 21. In a next step SA420, based on the summed saturation distribution, a saturation index is determined for this image. According to this embodiment, a range occupied by the upper 16% of distribution number is found within the number of picture elements determined to be the object. Assuming that the lowest saturation "A" in this range represents the saturation of the image, a saturation emphasis index S is determined based on the following equation. In other words, it is assumed that:

$$\text{If } A<92, S=-A\times(10/92)+50 \tag{20}$$

$$\text{If } 92\leq A<184, S=-A\times(10/46)+60 \tag{21}$$

$$\text{If } 184\leq A<230, S=-A\times(10/23)+100 \tag{22}$$

$$\text{If } 230\leq A, S=0 \tag{23}$$

Figure 22:
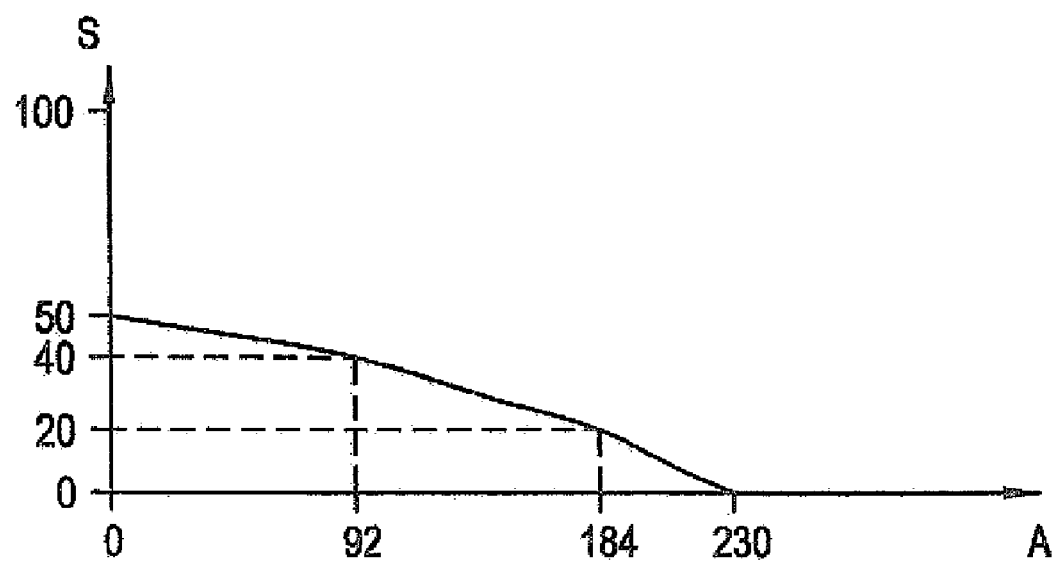
FIG. 22 is a diagram showing a relation between a saturation A and saturation emphasis index S.

FIG. 22 shows a relation between this saturation "A" and the saturation emphasis index S. As shown in the figure, in the range between the maximum value "50"-minimum value "0", the saturation index S gradually varies so that it is large when the saturation A is small, and small when the saturation A is large.

When saturation is emphasized based on the saturation emphasis index S, if the image data is provided with saturation parameters as stated above, the parameters may be converted. When an RGB color specification space is adopted, the data must first be converted into the Luv system which is a standard color system, and moved in a radial direction within the Luv space. However, this means that RGB image data must first be converted into image data in Luv space, and then returned to RGB after saturation emphasis which involved an enormous amount of computation. Therefore, RGB gradation data are used without modification for saturation emphasis.

When the components are component values of hue components which are in a schematic pair relation as in the case of the RGB color specification space, the color is grey and there is no saturation if R=G=B. Therefore if the component which has the minimum value in RGB is considered merely to have a reduced saturation without having any effect on the hue of the picture elements, the minimum of each component may be subtracted from all the component values, and the saturation emphasized by increasing the value of the difference.

First, a parameter Sratio which is useful for calculation is found from the aforesaid saturation emphasis index S by the equation:

$$Sratio=(S+100)/100 \tag{24}$$

In this case the saturation emphasis parameter Sratio=1 when the saturation emphasis index S=0, and saturation is not emphasized. Next, assuming that the value of the blue (B) component in the components (R, G, B) of the RGB gradation data is the minimum, this saturation emphasis parameter Sratio is used to perform the following conversion:

$$R'=B+(R-B)\times Sratio \tag{25}$$

$$G'=B+(G-B)\times Sratio \tag{26}$$

$$B'=B \tag{27}$$

As a result, two-way color conversions between the RGB color specification space and the Luv space are rendered unnecessary, and computing time can be reduced. In this embodiment, as for non-saturation components, the component with the minimum value was simply subtracted from other component values, but other conversion equations may be used to subtract non-saturation components. However when only the minimum values are subtracted as in equations (25)-(27), there are no multiplications or divisions so the computation is easier.

When the equations (25)-(27) are used, a good conversion is possible, however in this case when saturation is emphasized, luminance also increases so the image becomes lighter overall. Therefore, the conversion is performed using a difference value obtained by subtracting an equivalent luminance value from each component value.

Firstly to find the luminance, as the computation becomes bulky when a color conversion is performed in Luv space, the following equation which is used in television for example, is used to find the luminance from RGB. The luminance Y is given $$\text{by } Y=0.30R+0.59G+0.11B \tag{28}.$$

It will be assumed that saturation emphasis is given by $$R'=R+\Delta R \tag{29}$$

$$G'=G+\Delta G \tag{30}$$

$$B'=B+\Delta B \tag{31}.$$

These addition/subtraction values $\Delta R$, $\Delta G$, $\Delta B$ are found by the following equations based on difference amount values:

$$\Delta R=(R-Y)\times Sratio \tag{32}$$

$$\Delta G=(G-Y)\times Sratio \tag{33}$$

$$\Delta B=(B-Y)\times Sratio \tag{34}$$

As a result, the conversion can be performed by $$R'=R+(R-Y)\times Sratio \quad (35)$$

$$G'=G+(G-Y)\times Sratio \quad (36)$$

$$B'=B+(B-Y)\times Sratio \quad (37)$$

Conservation of luminance is clear from the following equations:

$$Y' = Y + \Delta Y \quad (38)$$

$$\Delta Y = 0.30\Delta R + 0.59\Delta G + 0.11\Delta B \quad (39)$$
$$= Sratio\{(0.30R + 0.59G + 0.11B) - Y\}$$
$$= 0$$

Also, when the input is grey (R=G=B), the luminance Y=R=G=B, the addition/subtraction values ΔR=ΔG=ΔB=0 and there is no color in the achromaticity. If equations (35)-(37) are utilized, the luminance is stored, and the image does not become lighter overall even if saturation is emphasized.

If the saturation emphasis index Sratio is found as described above, it is compared with a predetermined threshold value in a step SA430, and it is determined whether the image requires saturation emphasis. If it is necessary, the image data for all picture elements is then converted based on equations (35)-(37) in a step SA440.

Therefore, in the steps SA410-SA430, the need for saturation emphasis processing and its extent is determined, and when it is deemed necessary in the step SA430, saturation emphasis processing is performed. A processing unit therefore comprises hardware and software to accomplish these functions.

Figure 23:
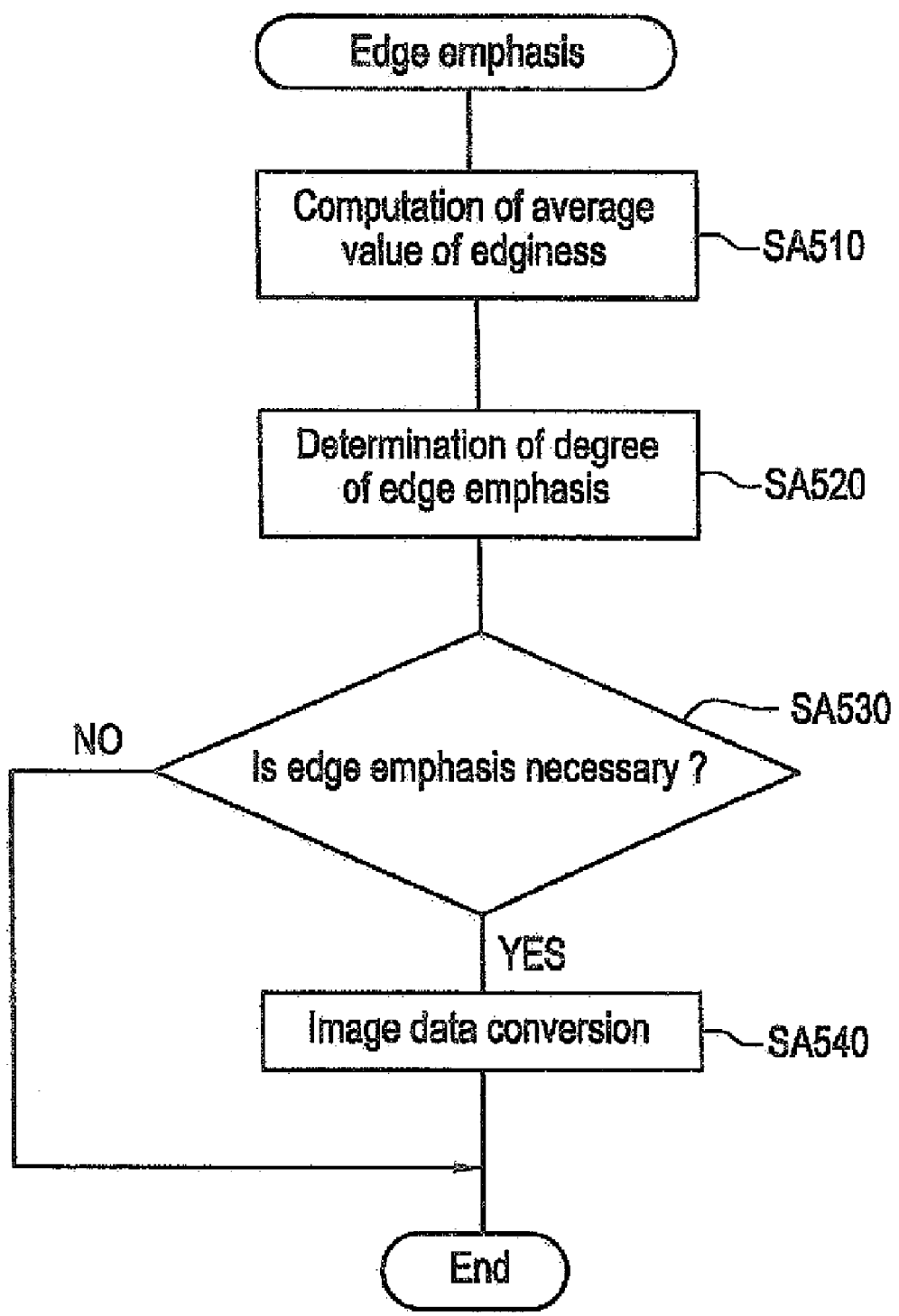
FIG. 23 is a flowchart showing a case when edges are emphasized in the latter part of main processing.

To determine the content and extent of image processing based on object picture elements, edge emphasis processing may also be used. FIG. 23 shows a flowchart of this edge emphasis processing. AS object picture elements are selected, the edginess is averaged for object picture elements by dividing the integrated edginess by the number of picture elements in a step SA510. If the number of picture elements is E (I) Pix, the sharpness degree SL of the object image may be computed by $$SL = \sum_{x,y} |g(x,y)|/E(I)pix. \quad (40)$$

In this case, the degree of sharpness is lower (the image appears more blurred) the lower the SL value of the image, and the degree of sharpness is higher (the image appears clearer) the higher the SL value of the image.

On the other hand because the sharpness of the image is subjective, the degree of sharpness SL is found in the same way for image data having an optimum sharpness obtained experimentally, this value is set as an ideal sharpness SLopt, and a degree of edge emphasis Eenhance is found from the relation $$Eenhance = ks \cdot (SLopt-SL)^{**}(1/2) \quad (41)$$

in a step SA520.

Figures 24, 25:
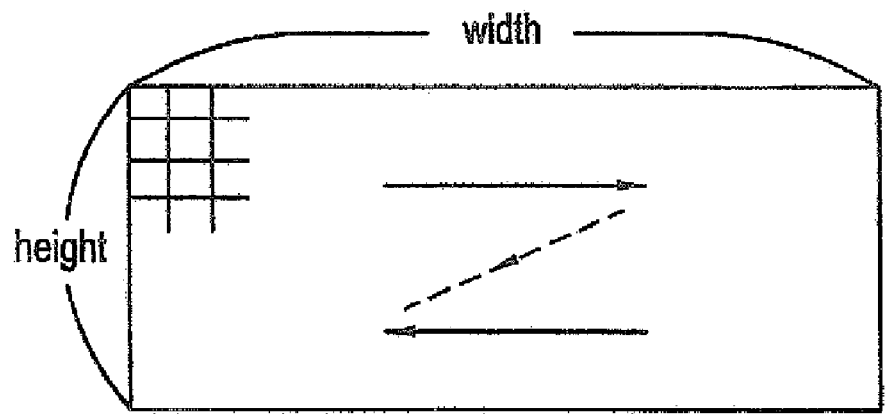
FIG. 24 is a diagram showing the magnitude of image data and a state where image data to be processed is displaced.
FIG. 25 is a diagram showing a 5×5 picture element unsharp mask.

Herein, ks varies based on the magnitude of the image, and when the image data comprises height dots and width dots in the vertical and horizontal directions as shown in FIG. 24, ks is found from $$ks = \min(height, width)/A \quad (42)$$

Herein, min (height, width) denotes the smaller of height and width, and A is the constant "768". It will be understood that these relations are obtained from experiment, and may be modified as appropriate. However, good results are basically obtained by making the degree of emphasis larger the larger the image.

When the degree of edge emphasis Eenhance is found in this manner, it is compared with a predetermined threshold value in a step SA530, and it is determined whether edge emphasis is necessary. If it is deemed to be necessary, edge emphasis processing is performed on all picture elements in a step SA540.

In edge emphasis processing, a luminance Y' after emphasis relative to the luminance Y of each picture element before emphasis is computed by:

$$Y' = Y + Eenhance \cdot (Y - Yunsharp) \quad (43)$$

Herein, Yunsharp is unsharp mask processing relative to image data of each picture element. Unsharp mask processing will now be described. FIG. 25 shows an example of a 5×5 picture element unsharp mask. In this unsharp mask 41, the central value "100" is a weighting of a picture element Y (x,y) in matrix image data, which is used for multiplication with weighting corresponding to a numerical value in the grid of the mask for edge picture elements. When this unsharp mask 41 is utilized, multiplication is performed based on the computational equation Yunsharp $$(x, y) = (1/396) \sum_{i,j} (Mij \times Y(x+1, y+j)) \quad (44)$$

In equation (44), "396" is a total value of weighting coefficients, and it is the total value of each grid division in unsharp masks of different size. Mij is a weighting coefficient written in a grid division of the unsharp mask, and Y (x, y) is image data for each picture element. ij is expressed in horizontal and vertical coordinate values for the unsharp mask 41.

The meaning of the edge emphasis computation based on equation (43) is as follows. As Yunsharp (x, y) is added by making the weighting of edge picture elements lower than that of main picture elements, the result is "unsharp" image data. Images which are made unsharp in this way have the same meaning as those subjected to a low pass filter. Therefore, "Y(x, y)−Unsharp (x,y)" means low frequency components are removed from the total components, which has the same meaning as applying a high pass filter. If high frequency components which passed through the high pass filter are multiplied by the edge emphasis Eenhance and added to "Y(x, y)", the high frequency components are increased in direct proportion to the edge emphasis Eenhance, and the edges are thereby emphasized. Considering the situation when edge emphasis is needed, edge emphasis refers to the edge of the image, and it therefore may be computed only when there is a large difference of image data between adjacent picture elements. If this is done, there is no need to compute an unsharp mask for most image data which is not edge parts, so the amount of processing is vastly reduced.

In the actual computation, if we write:

$$\Delta = Y - Y' \quad (45)$$

from the luminance Y' after emphasis and the luminance Y before emphasis, R' G' B' after conversion may be computed as:

$$R'=R+\text{delta}$$

$$G'=G+\text{delta}$$

$$B'=B+\text{delta} \quad (46).$$

Therefore, in this edge emphasis processing in the steps SA510-SA530, the need for edge emphasis and its extent are determined, and image processing is performed when it is determined to be necessary in the step SA530. A processing unit comprising hardware and software is provided to perform these functions.

It is determined whether to perform image processing regarding contrast correction, lightness compensation, saturation emphasis and edge emphasis. However, it is not absolutely necessary to make a choice as to whether or not to perform image processing. Specifically, an emphasis degree may be set for each, and image processing performed with the set emphasis degree. Of course, in this case also, the contents and extent of image processing which should be performed are determined, and the processing is performed.

Next, the operation of this embodiment having the aforesaid construction will be described.

A photographic image is read by the scanner 11, and printed by the printer 31. Specifically, when the operating system 21a is running on the computer 21, the image processing application 21d is started, and reading of the photograph is started by the scanner 11. After the read image data has been assimilated by the image processing application 21d via the operating system 21a, the picture elements to be processed are set in initial positions. Next, the edginess is determined based on equations (1)-(3) in the step SA110, and the edginess is compared with a threshold value in the step SA120. When the edginess is large, it is determined that the picture element to be processed is an edge picture element, and image data for the corresponding picture element is stored in the work area in the step SA130. In the step SA140, it is determined whether or not picture elements to be processed are to sampled uniformly, and if so, in the step SA150, image data for these picture elements is stored in the work area. The above processing is repeated until it is determined to have been performed for all picture elements in the step SA160 while picture elements to be processed are displaced in the step SA150.

When this has been performed for all picture elements, image data for picture elements determined to be those of the object are stored in the work area. Therefore, even if the situation of a photographic image read from the image data in this work area is determined, the nature of the image is not misinterpreted due to the effect of the background, etc. According to this embodiment, image data was stored in the work area, but from the viewpoints of memory capacity and processing time, it is not absolutely necessary to store image data itself in the work area. Specifically, histograms of luminance distribution or saturation substitute value distribution for picture elements determined to be those of the object are generated, and histogram information may therefore be pre-stored in the step SA140.

When contrast correction and luminance compensation are performed automatically, a histogram of luminance distribution is found in the step SA140 or the step SA310, a parameter for expansion processing is determined based on equations (8), (9) in the step SA320, and a parameter for luminance compensation is determined based on equations (10)-(13) in the step SA330. These parameters are compared with a predetermined threshold value in the step SA340, and if it is determined that image processing should be performed, the luminance is converted based on the aforesaid parameter in the step SA350. In this case, the luminance conversion table shown in FIG. 16 may be generated to reduce the computing amount, and image data may be converted based on equations (14)-(16).

Subsequently, the processed image data may be displayed on the display 32 via the display driver 21c, and if it is satisfactory, it is printed by the printer 31 via the printer driver 21b. In other words the printer driver 21b inputs RGB gradation data with emphasized edges, performs rasterization corresponding to the print head area of the printer 31 after a predetermined mapping, color converts rasterized data from RGB to CMYK, converts CMYK gradation data to binary data, and outputs it to the printer 31.

Due to the above processing, photographic image data read via the scanner 11 is automatically subjected to the optimum contrast correction and lightness compensation, displayed by the display 32, and printed by the printer 31. In other words, it is determined whether or not contrast correction and lightness compensation are necessary based on the object part of the corresponding photographic image, and if it is necessary, the optimum degree of image processing is performed. When object picture elements are sampled, although edginess is required to determine parameters, it is not necessary to find the edginess for all picture elements. The edginess may be determined for sampled picture elements, and a determination made as to whether or not the picture elements are those of the object.

The invention is not limited to this contrast correction and luminance compensation. In the case also of saturation emphasis and edge emphasis, picture elements for which there is a large variation amount are determined to be those of the object. The content and extent of image processing are determined based on image data for object picture elements, and the necessary processing is performed.

Hence, the computer 21 which is the core of image processing calculates the edginess, which is the image variation amount, from data for adjacent picture elements in the step SA110, selects only images which have a large edginess and determines them to be object picture elements in the steps SA120, SA130, and calculates optimum parameters for performing contrast correction and lightness compensation from image data for object picture elements in the steps SA310-SA330. An image processing indicator can therefore be determined based on image data for object picture elements, and optimum image processing can be performed automatically.

Embodiment 2

Next, an embodiment of an image processing apparatus will be described wherein an image processing indicator specifying unit comprises a feature amount uniform sampling unit, and a predetermined weighting is applied after sampling without a large computational amount in the sampling stage so as to automatically perform optimum image processing.

Figure 26:
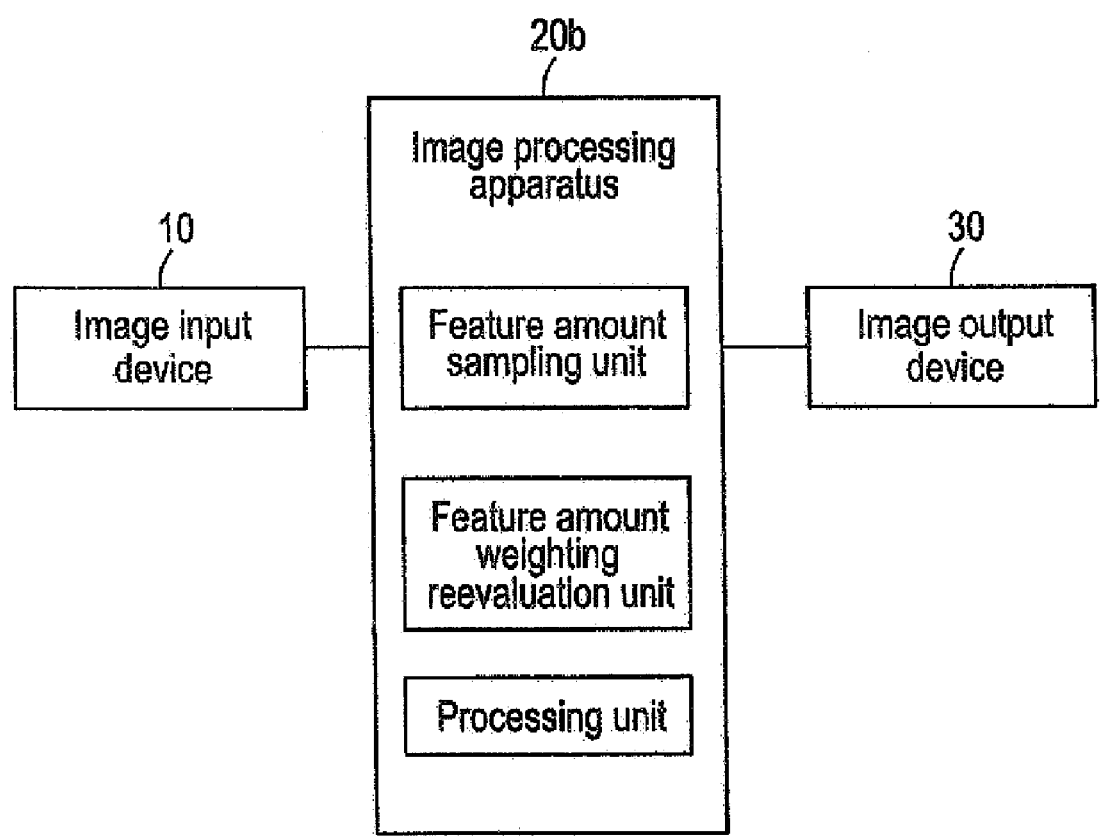
FIG. 26 is a block diagram of an image processing system in which an image processing apparatus according to one embodiment of this invention is applied.

FIG. 26 is a block diagram of an image processing system to which the image processing apparatus according to one embodiment of this invention is applied. The actual hardware construction may be similar to the system shown in FIG. 2.

In FIG. 26, an image reader 10 outputs photographic image data represented as dot matrix picture elements to an image processing apparatus 20B, and the image processing apparatus 20B performs image processing after determining a degree of emphasis via a predetermined process. The image processing apparatus 20B outputs the processed image data to an image output device 30, and the image output device 30 outputs the processed image in dot matrix picture elements. Herein, the image data which the image processing apparatus 20B outputs is obtained by uniformly sampling feature amounts from picture elements by a predetermined criterion, reevaluating them with a predetermined weighting, and processing them with an emphasis degree determined according to the reevaluated feature amounts. Therefore, the image processing apparatus 20B comprises a feature amount uniform sampling unit which uniformly samples feature amounts, a feature amount weighting reevaluation unit which reevaluates sampled feature amounts with a predetermined weighting, and a processing unit which performs image processing with the degree of emphasis according to the reevaluated feature amounts.

Figure 27:
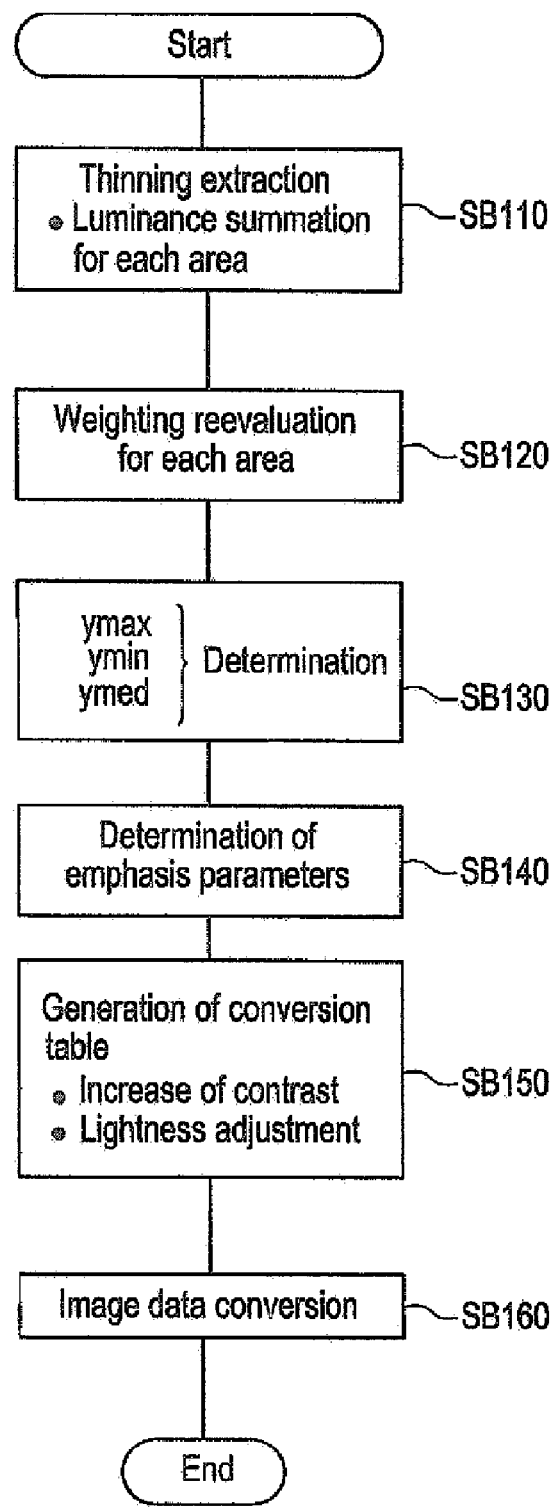
FIG. 27 is a flowchart showing image processing in the image processing apparatus according to this invention.

Specifically, the determination of the object and accompanying image processing are performed by an image processing program in the aforesaid computer 21 corresponding to a flowchart shown in FIG. 27. In the flowchart shown in the figure, image processing is performed to adjust the contrast of the image. After sampling luminance which is a feature amount while uniformly thinning out picture elements from the whole image in a step SB110, this feature amount is reevaluated by applying a predetermined weighting in a step SB120, and image processing to adjust luminance is performed in steps SB130-SB160.

In the step SB110, the luminance of each picture element in dot matrix image data in the horizontal and vertical directions is found as shown in FIG. 24, and a histogram is generated. In this case, if the processing is applied to all picture elements it can be said to be precise, but as the summation results are reevaluated by weighting, it does not necessarily have to be precise. Therefore picture elements wherefrom the luminance has been sampled to within the limits of a certain error are thinned out, processing amount is reduced, and the process is thereby speeded up. According to statistical error, an error for a sample number N can generally be represented by $1/(N^{}(1/2))$ where  represents involution.

Therefore in order to perform processing with an error of around 1%, N=10000.

Figure 29:
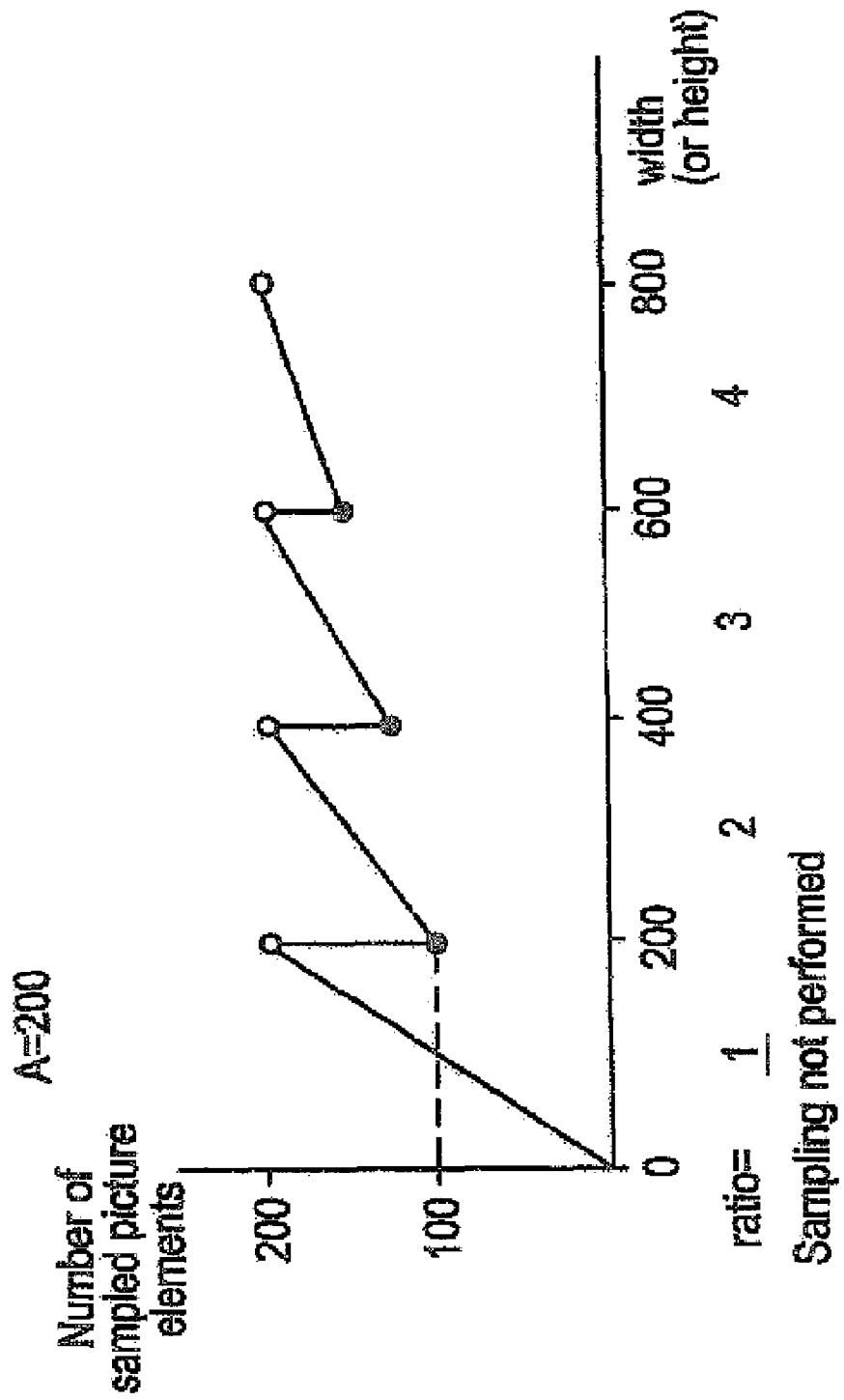
FIG. 29 is a diagram showing a picture element sampling number.

Herein, the bitmap screen shown in FIG. 24 is number of (width)×(height) picture elements, and a sampling period ratio is given by $$\text{ratio} = \min(\text{width, height})/A + 1 \qquad (47).$$

min (width, height) is the smaller of width and height Herein, and A is a constant. The sampling period ratio mentioned here expresses how frequently to perform sampling in numbers of picture elements, and the mark O in FIG. 28 shows the case where the sampling period ratio=2. In other words, one picture element is sampled every two picture elements in the vertical and horizontal directions, so sampling is performed every other picture element. The number of sampling picture elements in 1 line when A=200 is as shown in FIG. 29.

As is clear from the figure, except for the case when the sampling period ratio=1 when sampling is not performed, at least 100 picture elements are sampled when there is a width of 200 picture elements or more. Therefore, when there are 200 or more picture elements in the vertical and horizontal directions (100 picture elements)×(100 picture elements)= 10000 picture elements are sampled and the error is 1% or less.

The reason for taking min (width, height) as a basis is as follows. For example, as shown by the bitmap in FIG. 30(*a*), if width>>height and the sampling period ratio is determined by width which is the longer direction, only two lines of picture elements, i.e. the top edge and bottom edge, can be sampled in the vertical direction as shown in (b).

However, if the sampling period ratio is determined based on the smaller of the two as min (width, height), thinning which includes the middle part can be performed even in the lesser, vertical direction as shown in (c). In other words, sampling with a predetermined number of samplings can be guaranteed.

Here, the feature which is sampled with thinning of picture elements is luminance. As described above, according to this embodiment, the data handled by the computer 21 is RGB gradation data, and it does not directly have luminance values. To calculate luminance, a color conversion to the Luv color specification space could be performed, but this is not a good solution due to the problem of computing amount.

For this purpose, the aforesaid equation (28) which calculates luminance directly from RGB and is used for television, etc., is utilized here.

Figure 31:
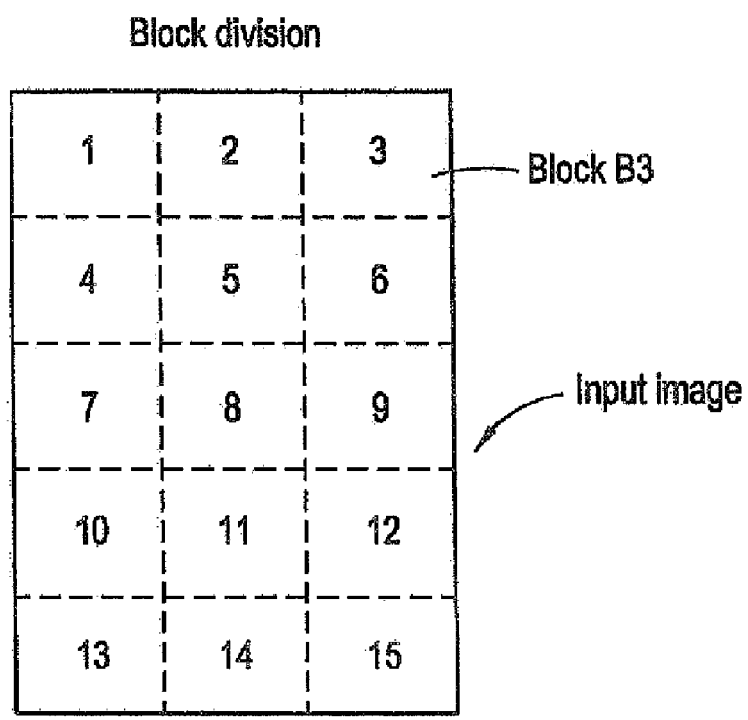
FIG. 31 is a diagram showing a block arrangement resulting from image division.

Also, the luminance histogram is not summed for the whole image, but the input image is divided into 3 horizontal blocks and 5 vertical blocks, i.e. a total of 15 blocks, and the summation carried out for each block, as shown in FIG. 31. According to this embodiment there are 15 blocks, however there is of course no restriction on the block division used. In particular, with printer drivers, etc., image data is received from an application in block units, and these blocks may also be used to demarcate areas for weighting.

Figure 32:
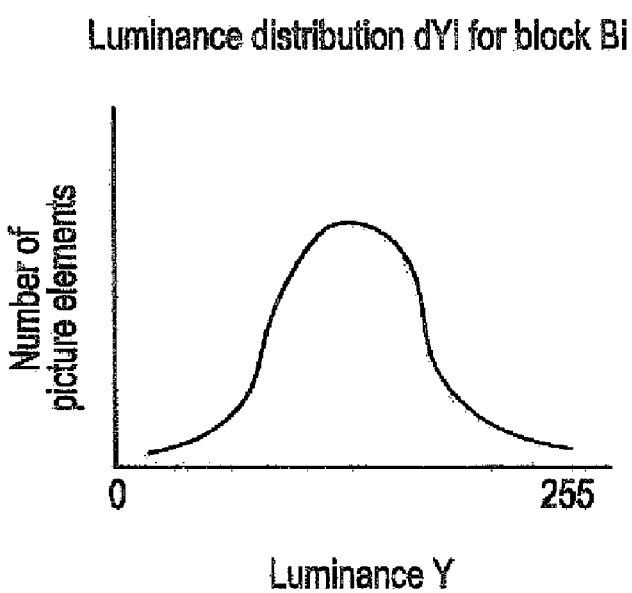
FIG. 32 is a diagram showing a block luminance distribution.

The reason for summing in blocks in this way is to reduce the processing amount required. As reevaluation with weighting is performed in the step SB120 it is not absolutely necessary to perform the summation for each block, and the summation may instead take the form of a histogram which considers the weighting for each selected picture element. Moreover, as the weighting changes relative to the summation result regardless of blocks, the summation can also be made with one histogram using a weighting depending on the block. FIG. 32 is a figure showing an example of luminance distribution of the block Bi.

When the summation is to performed for each block, a reevaluation is made by weighting according to area in the step SB120. FIG. 33 and FIG. 34 show examples of weighting each block. In the case of an ordinary photographic image, the object being photographed is usually in the center. In this sense, the feature amount should be evaluated placing more on the center part of the image data. On the other hand, in the case of a souvenir photo taken in front of a building, the person being photographed is generally in bottom center. Specifically, the person is usually in the lower part of the image with respect to height above ground. In this case therefore, the feature amount should be evaluated by weighting the lower middle part of the image. FIG. 33 shows an example of the former case, and FIG. 34 shows an example of the latter.

If the weighting of each block=Wi (i) (i=1-15) and the weighted, reevaluated luminance distribution is DY, $$SP = \sum_{i=1\sim15} Wi \qquad (48)$$

$$Ki = Wi/SP \qquad (49)$$

then:

$$DY = \sum_{i=1\sim15} Ki * dYi \qquad (50)$$

After the histogram of the reevaluated luminance distribution is obtained in this way, the intensity of image processing is calculated from this feature amount. In other words, the width for increasing contrast is determined. This is done exactly as described above, i.e. a maximum value ymaX, minimum value ymin and median ymed are acquired in the step SB130, the expansion factor a and offset b are found in the step SB140, and processing to generate a conversion table is performed in the step SB150. In the step SB160, for image data (R0, G0, B0) for all picture elements, the processing to obtain image data (R, G, B) after conversion is repeated while referring to conversion tables corresponding to equations (14)-(16).

A processing unit is provided comprising the hardware and software to perform the steps SB130-SB160. It will moreover be understood that although according to this embodiment, the image processing described is that of contrast correction and lightness compensation, the invention may be applied in exactly the same way to other image emphasis processing.

Figure 35:
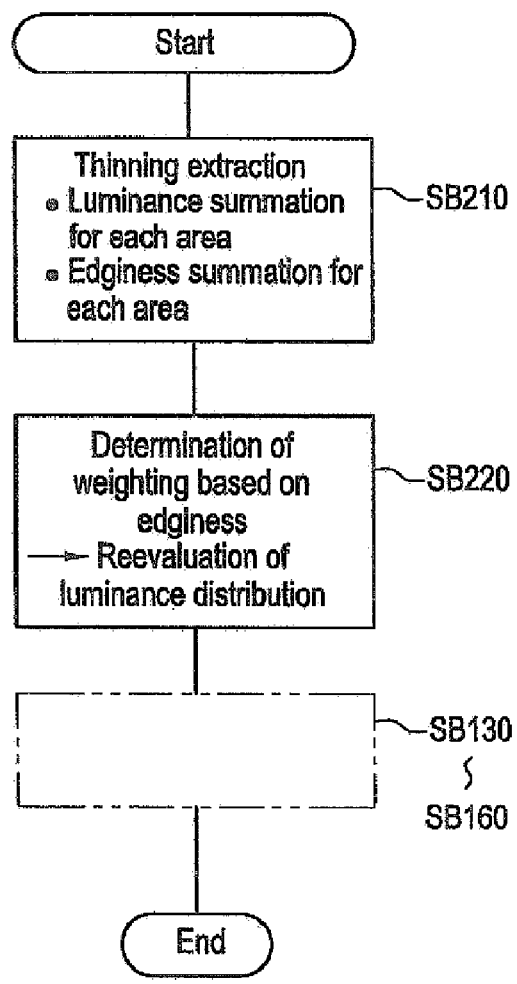
FIG. 35 is a flowchart showing a case when a feature amount is reevaluated based on an edginess amount.

In the above processing, the feature amount was reevaluated by weighting according to a position in the image. However the weighting criterion is not limited to this, and various other types of criterion are possible. As an example, FIG. 35 shows a flowchart for the case where the object being photographed is detected from the image variation amount, and the weighting is varied.

A step SB210 replaces the above step SB110, and luminance is summed while thinning out picture elements uniformly. However, instead of summation only of luminance, edginess can also be summed as shown below.

Figure 36:
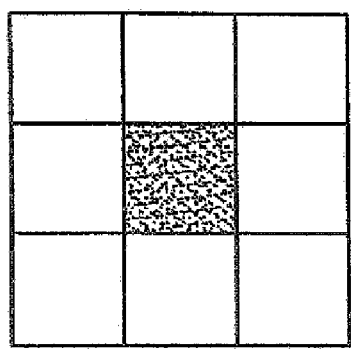
FIG. 36 is a diagram showing a relation between a main picture element and edge picture elements for determining the edginess amount.

In the input image it can be said that contrast of the background changes gradually; on the other hand, the object is sharp and so there is an intense change of luminance. Therefore, a difference of density is found between one picture element and surrounding picture elements as shown in FIG. 36. This density difference is taken as the edginess of the picture element considered. This density difference may be computed by applying a filter. FIG. 37(*a*)-(*f*) show several examples of such a filter, and show weighting coefficients when the luminance is weighted for a specific picture element and eight surrounding picture elements. Here, in the case of (a), the weighting is found for nine picture elements, so nine multiplications and eight additions are necessary to calculate the edginess of each picture element. When the image becomes large, it is impossible to ignore this computing amount, so five multiplications and four additions are performed in (b), (c), three multiplications and two additions are performed in (d), (e) and one addition are performed in (f)

In these examples, the picture element in question is compared only with surrounding picture elements. With the "unsharp masks", the sharpness of the considered picture element may be found by using a wider range of image data. However, as edginess in this embodiment is only a tool to evaluate the weighting per block, even the filters of these examples of reduced computation amount give sufficiently good results.

The summation of edginess may be performed by summing the edginess of picture elements for each block. Alternatively, when the absolute value of this edginess is larger than a predetermined threshold value absolutely, the picture element is determined to be an edge picture element, and the total number of edge picture elements for each block is summed. When the edginess in each block is written as ERi (i=1-15), this total number SE is given by:

$$SE = \sum_{i=1 \sim 15} ERi \quad (51)$$

so the weighting coefficient KEi itself may be expressed as $$KEi = ERi/SE \quad (52).$$

Therefore the luminance distribution DY which is reevaluated by weighting may be calculated as:

$$DY = \sum_{i=1 \sim 15} KEi * dYi \quad (53)$$

Also, if the total number of edge picture elements in each block is ENi (i=1-15), the total number SE is:

$$SE = \sum_{i=1,15} ENi. \quad (54)$$

The weighting coefficient KEi itself is expressed as $$KEi = ENi/SE \quad (55),$$

so the luminance distribution DY which was reevaluated by equation (53) can be obtained. In any case, the luminance distribution DY is reevaluated based on the computational equation (53) in the step SB220.

In this example, the luminance of picture elements determined to be edge picture elements is not sampled. Instead, the edginess and total number of edge picture elements is merely used for determining block weighting coefficients. In other words, instead of summing the feature amounts for picture elements having a specific property (edginess), an average feature amount which is not uneven can be obtained for the block.

If the luminance distribution is reevaluated in this way, the contrast may be increased and the lightness may be modified by the processing of the aforesaid steps SB130-SB160.

Figure 38:
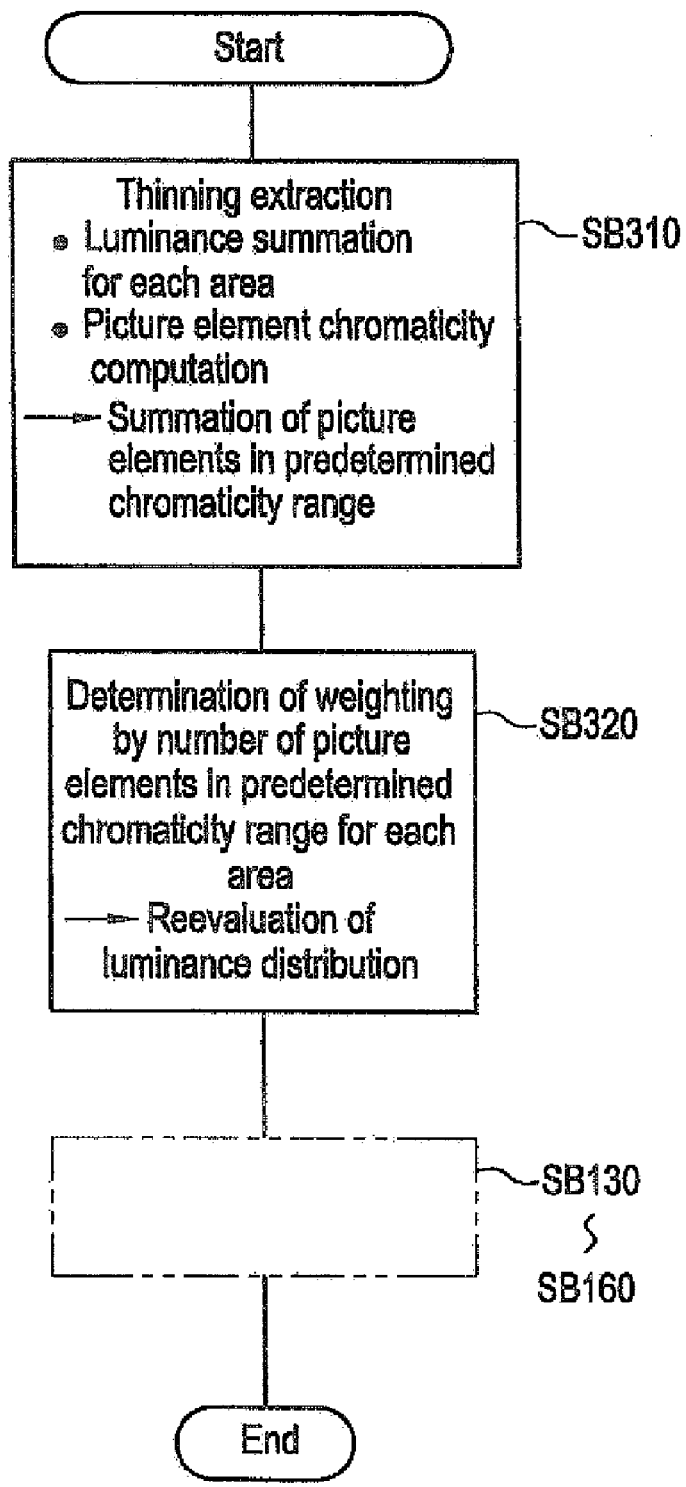
FIG. 38 is a flowchart showing a case when a feature amount is reevaluated based on an edginess amount.

In view of the fact that the original object is often that of a person, a reevaluation may also be made by placing more weight on picture elements with skin color. FIG. 38 shows a flowchart wherein attention is paid to a specific color to determine block weighting coefficients.

In a step SB310 corresponding to the step SB110, luminance is summed by the same thinning process, it is determined whether or not picture elements appear to have skin color based on the chromaticity of each picture element, and all picture elements having skin color are then summed. For chromaticity, x-y chromaticity is calculated for each picture element. Now, if $$r = R/(R+G+B) \quad (56)$$

$$g = G/(R+G+B) \quad (57)$$

when the RGB gradation data of object picture elements in the RGB colorimetric system is (R, G, B), the following relationships exist between chromaticity coordinates x, y in the X, Y, Z colorimetric system:

$$x = (1.1302 + 1.6387r + 0.6215g)/(6.7846 - 3.0157r - 0.38579) \quad (58)$$

$$y = (0.0601 + 0.9399r + 4.5306g)/(6.7846 - 3.0157r - 0.3857g) \quad (59).$$

Herein, as chromaticity represents an absolute proportion of a color stimulation value without it being affected by lightness, it may be said that the nature of an object can be determined from the chromaticity of its picture elements.

Since $$0.35 < x < 0.40 \quad (60)$$

$$0.33 < y < 0.36 \quad (61)$$

in the case of skin color, it may be considered that if a picture element is within this range when chromaticity is determined for each picture element, that picture elements shows a person's skin, and the number of skin color picture elements in the block is increased by one.

After the number of skin color picture elements is obtained in this way, in the next step SB320 weighting coefficients are determined as in the case of edge picture elements described above, and the luminance distribution DY is reevaluated. Specifically, if the number of skin color picture elements in each block is written as CNi (i=1-15), the total number SC of such elements is:

$$SC = \sum_{i=1\sim15} CNi \quad (62)$$

Therefore the weighting coefficient KCi is expressed by $$KCi = CNi/SC \quad (63),$$

and the luminance distribution DY reevaluated with this weighting may be calculated by $$DY = \sum_{i=1\sim15} KCi * dYi. \quad (64)$$

Figure 39:
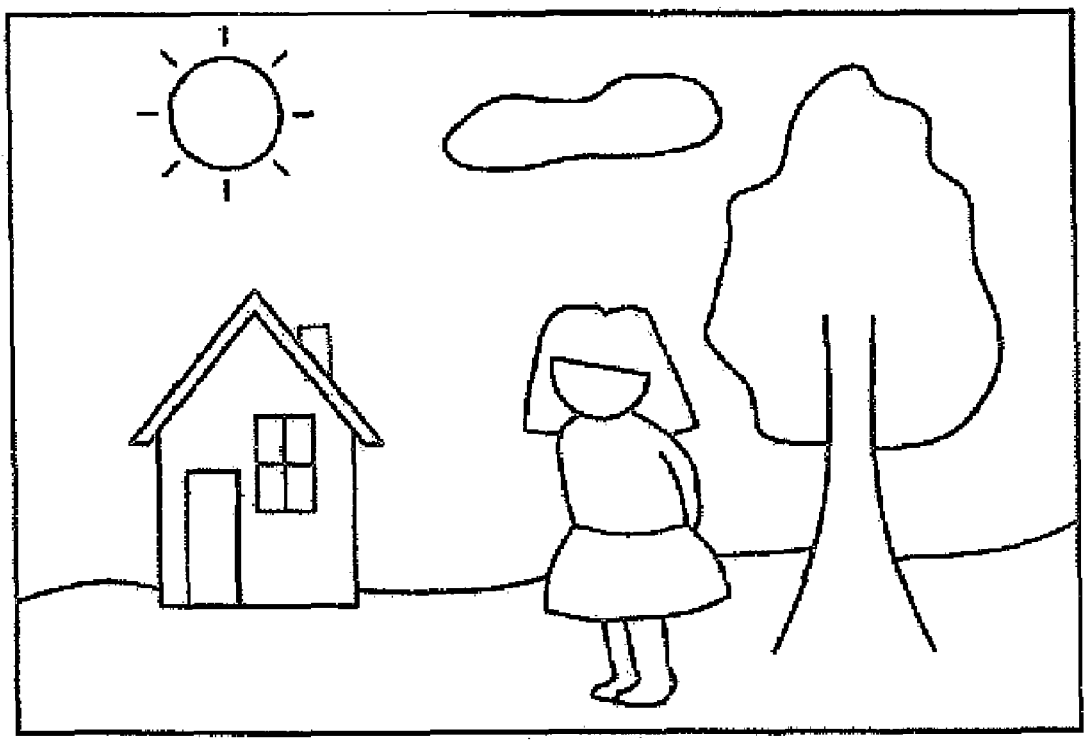
FIG. 39 is an example of a photographic image.

Also in this example, the luminance of picture elements determined to be skin color picture elements is not sampled, the total number of skin color picture elements merely being used for determining block weighting coefficients. Therefore an average feature amount that is not uneven can be obtained for the block. In this case too, after the luminance distribution has been reevaluated in this way, the contrast may be corrected and lightness compensated by the processing of the aforesaid steps SB130-SB160. In the case of the photograph shown in FIG. 39, a girl appears in the center, and picture elements of the face, arms and legs are determined to be skin color picture elements. Of course, the chromaticity may also be found and picture elements summed for other colors.

Until now, the weighting coefficient was determined by one factor, but the importance of each factor may also be added and the above processing applied repeatedly. When the weighting coefficient of each block Bi (i=1-15) is Tji for a factor j (1=position in image, 2=edginess, 3=skin color picture element number), the weighting Tji distributed among blocks for each factor is a temporary weighting, $$Sj = \sum_{i=1\sim15} Tji \quad (65)$$

and $$Kji = Tji/Sj, \quad (66)$$

then the real weighting coefficient Ki in the block Bi is given by $$Ki = \sum_{j=1\sim3} Aj * Kji. \quad (67)$$

Aj is a coefficient to represent the importance of each factor, and is suitably determined so that the total number is 1. If skin color is emphasized as an example, the settings A1=0.2, A2=0.2, A3=0.6 are possible.

Next, the effect of this embodiment having the aforesaid construction will be described. First, a description will be given along the lines of the previous embodiment.

A photographic image is read by the scanner 11, and printed by the printer 31. Specifically, when the operating system 21a is running on the computer 21, the image processing application 21d is started, and reading of the photograph is started by the scanner 11. After the read image data has been assimilated by the image processing application 21d, the luminance of picture elements is summed while thinning in the step SB110. The summed luminance distribution dYi is reevaluated in the step SB120 based on determined weightings corresponding to the position of each block shown in FIG. 33 and FIG. 34, and ymax, ymin and ymed are calculated in the step SB130 based on the reevaluated distribution DY.

In the next step SB140, the slope a and offset b which are emphasis parameters are computed based on equations (8) or (9), the γ value of the γ correction required for lightness compensation is calculated based on equations (10)-(13), and the conversion data shown in FIG. 16 is generated in the step SB150. Finally, in the step SB160, the image data for all picture elements is converted by referring to this conversion table.

Figure 40A:
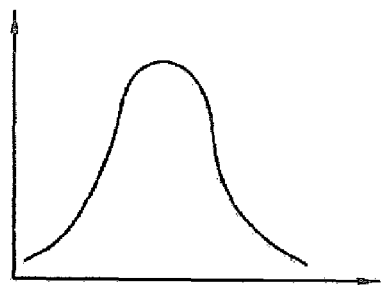
FIGS. 40(a)-(d) are diagrams of a luminance distribution of a photographic image photographed at night.
Figure 40B:
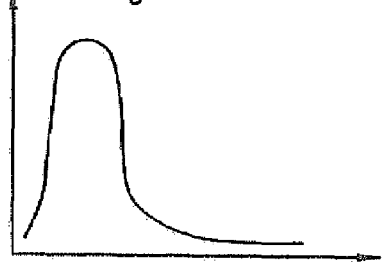
Figure 40C:
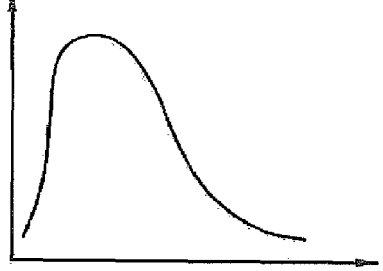

Using the weightings shown in FIG. 33, the weighting is higher for blocks near the center, so the summed luminance distribution is also weighted more heavily the closer it is to the center. Assume for example that a person is photographed at night using flash. Even if a good overall luminance distribution is obtained for the person as shown in FIG. 40(a) due to the effect of the flash, the part surrounding the person is dark, and here the luminance distribution is shifted towards the dark side as shown in (b). In this case if an average were merely taken, a luminance distribution shifted towards the dark side overall would still be obtained as shown in (c), and if the contrast were corrected and the lightness compensated, the image would only be made too light overall and would not be satisfactory.

Figure 40D:
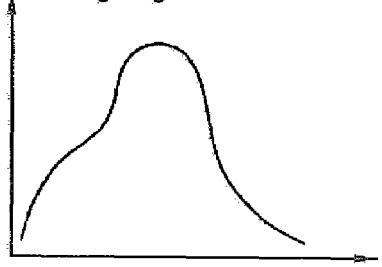

However, if more weighting is given to the center block as shown in FIG. 33, a luminance distribution DY is obtained which is strongly affected by the luminance distribution in the center of the image as shown in FIG. 40(d). Hence, the intensity of image processing based on this distribution is no longer a matter of over-emphasizing contrast and over-compensating lightness.

Conversely, if a person is photographed with a backlight, the face will be dark, and the background will be light, so a good luminance distribution will not necessarily be obtained overall. Yet even in this case, by giving more weight to the luminance distribution of center blocks where the face is dark as shown in FIG. 33, the dark luminance distribution is reflected, and image processing is performed to increase contrast and compensate lightness.

Due to the aforesaid processing, photographic image data read via the scanner 11 is processed automatically with optimum intensity, displayed on the display 32, and printed by the printer 31.

The computer 21 which is the core of image processing sums the luminance distribution which a feature amount for each area while uniformly selecting picture elements in the step SB110. In the step SB120, a reevaluation is performed with weightings determined for each area, and a luminance distribution strongly influenced by the intrinsic luminance distribution of the object can thus be obtained while uniform sampling is performed. The intensity of image processing is determined based on this luminance distribution in the steps SB130-SB150, and the image data is converted in the step SB160. Hence, image processing is performed with optimum intensity while the amount of processing is reduced.

Embodiment 3

Next, an embodiment will be described wherein the aforesaid image processing indicator specifying unit comprises an evaluation unit that obtains feature amounts based on a plurality of predetermined criteria, and the aforesaid processing unit which can convert image data by a plurality of methods, uses feature amounts according to the method.

Figure 41:
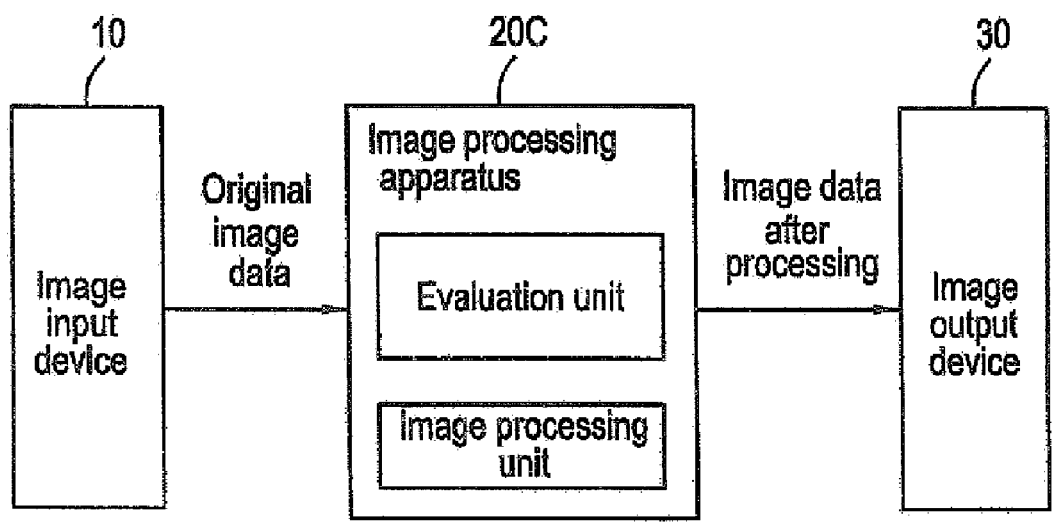
FIG. 41 is a block diagram of an image processing system in which an image processing apparatus according to one embodiment of this invention is applied.

FIG. 41 shows a block diagram of an image processing system which applies the image processing apparatus according to one embodiment of this invention. A typical hardware construction is similar to the system shown in FIG. 2.

In FIG. 41, the image reader 10 outputs photographic image data as dot matrix picture elements to the image processing apparatus 20C. When plural image processings are applied, the image processing apparatus 20C determines plural feature amounts based on the optimum criterion for each type of processing, and carries out each type of processing using the most appropriate feature amount. The image processing apparatus 20C outputs the processed image data to the image output device 30, and the image output device outputs the processed image in dot matrix picture elements.

The image processing apparatus 20C first sums the image data according to plural evaluation criteria, and thereby obtains plural feature amounts. In this sense, the image processing apparatus 20C comprises an evaluation unit, and as it performs image processing based on feature amounts which have been selected according to the image processing content, it may be said to further comprise an image processing unit.

Figure 42:
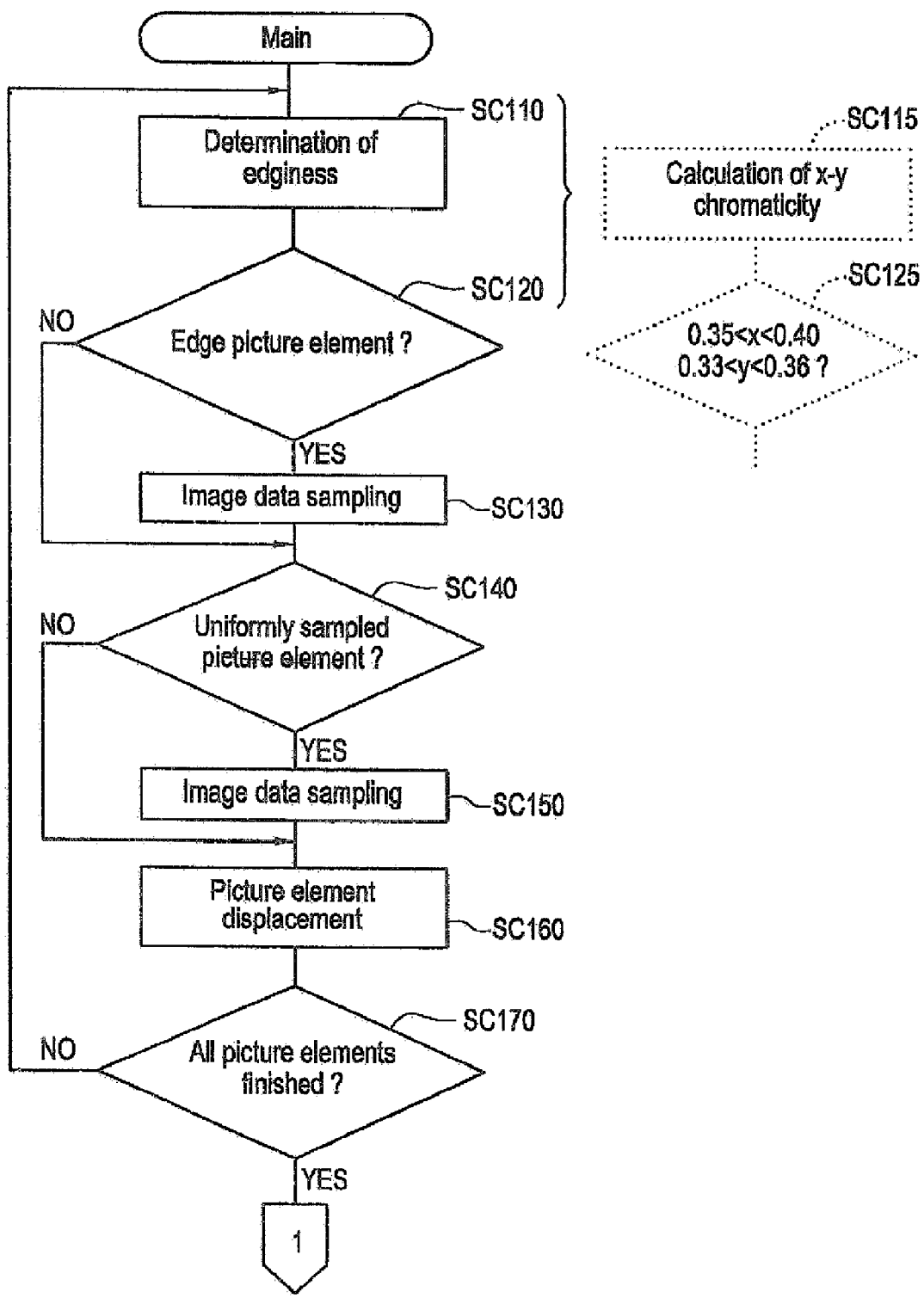
FIG. 42 is a flowchart showing a sampling part in an image processing apparatus according to this invention.

The acquisition of image feature amount of image and associated image processing are performed by the computer 21 with an image processing program corresponding to the flowchart shown in FIG. 42. The flowchart shown in the figure corresponds to the preceding stage in the image processing program, and processing is performed to sum image data according to plural evaluation criteria.

According to this embodiment, the case will be described where two evaluation criteria are used. Common points are that in both cases, not all picture elements are considered, picture elements are sampled according to predetermined criteria, and luminance is summed for the sampled picture elements.

What is different is that in one method, picture elements are sampled uniformly, whereas in the other method, edge picture elements are selected for sampling. Luminance summation results are described hereafter, but here it should be noted that plural feature amounts are obtained according to different evaluation criteria by changing the sampling method.

Uniform sampling means that luminance is summed for all picture elements in the image, and the luminance distribution is determined for the image as a whole. A feature amount is thereby obtained which is useful as a reference when a scenic photograph is dark overall or contrast is narrow. In the other method, as edge picture elements are a sharp part of the image, the luminance is summed for picture elements related to the object in the image. Therefore provided that the object is sufficiently light even if the background is dark, a feature amount is obtained which is useful as a reference when the image is sufficiently light. According to this embodiment, these feature amounts are selected automatically according to the image processing method.

Referring to the flowchart of FIG. 42, in this summation processing, object picture elements are main scanned in the horizontal direction and auxiliary scanned in the vertical direction for image data comprising dot matrix picture elements, and displaced, as shown in FIG. 24, and the summation is performed by determining whether or not each picture element scanned is to be included in the sampling.

First, in a step SC110, the edginess of each picture element is determined. Specifically, the determination of edginess may be the same as that of the aforesaid step SA110.

In the step SC120, the edginess is compared with the same threshold value, and it is determined whether or not the variation is large. If as a result of comparison it is determined that edginess is large, it is determined that this picture element is an edge picture element, and the image data for the picture element is sampled in a step SC130 and stored in the work area. The work area may be a RAM in the computer 21, or it may be a hard disk 22.

In this embodiment, the object is sampled based on edginess, but of course the method of sampling the object is not limited to this. For example, the chromaticity of each picture element may be found, and picture elements for which the chromaticity is within a predetermined range can be sampled as the object.

Specifically, the processing of the step SC110 and step SC120 is substituted by the processing of a step SC115 and a step SC125 respectively, the chromaticity for each picture element is calculated in the step SC115, and in the step SC125, it is determined whether or not the x-y chromaticity that was converted based on RGB gradation data for each picture element is within the range of skin color. If it is skin color, the image data of the picture element is sampled in the step SC130 and also stored similarly to work area.

On the other hand, in parallel with the aforesaid determination of edginess, it is determined in a step SC140 whether or not this picture element is to be sampled by uniform sampling. Uniform sampling is identical to the above. In the step SC140 it is determined whether or not the picture element is to be sampled, and if so, the picture element is sampled in a step SC150. It will be understood that the sampling of image data in the steps SC130, SC150 means the summation of luminance based on this image data.

To perform this processing for all picture elements of the image data, a picture element to be processed is displaced in a step SC160, and the processing is repeated until it is determined in a step SC170 that processing of all picture elements has finished.

Figure 43:
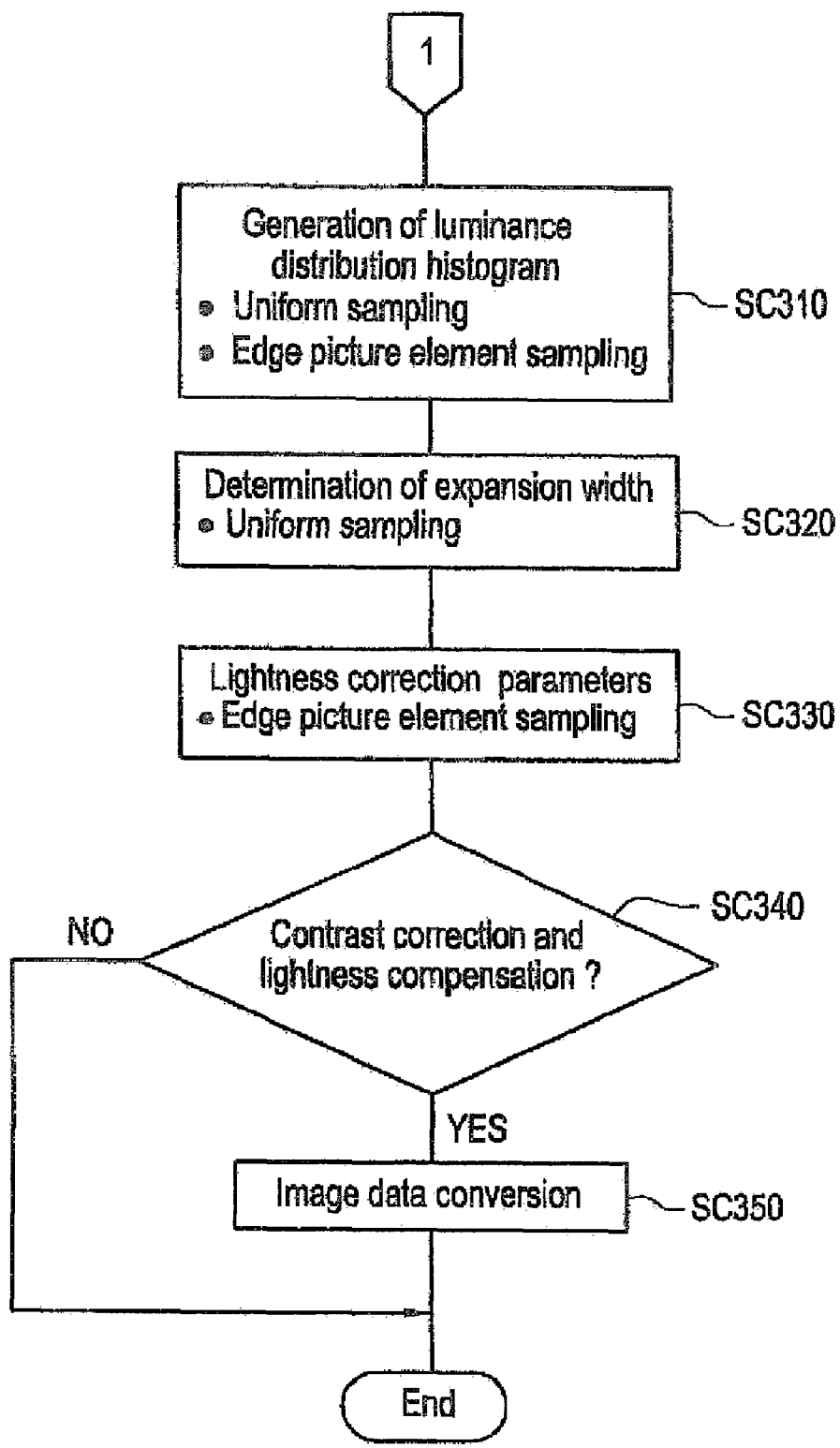
FIG. 43 is a flowchart showing a feature amount acquiring part and an image processing part.

Thereafter, a feature amount is obtained by using the summation result Dist_ave obtained by uniform sampling and the summation result Dist_edg obtained by edge picture element sampling according to the intended image processing method, and so optimum image processing based on this feature amount may be performed. As an example, FIG. 43 shows a flowchart for performing expansion of contrast and lightness compensation. The basic method of increasing contrast according to this embodiment is as described hereabove. The correction parameters are generated in steps SC310-SC330. Then, it is determined in a step SC340 whether contrast correction and lightness compensation are necessary, and if it is determined that they are, conversion of image data is performed in a step SC350. In this step SC350, reference is made to a conversion table corresponding to equations (14)-(16) for image data (R0, G0, B0) for all picture elements, and the process of obtaining image data (R, G, B) after conversion is repeated.

However in this case the luminance summation results are used as appropriate, and a feature amount is obtained comprising both ends and the median of the luminance distribution. Contrast correction and lightness compensation are applied using this feature amount, but this is not the only specific example of image processing, and there are also various feature amounts which may be used. For example, saturation emphasis image processing may be performed as shown in FIG. 20.

In this case, the evaluation unit comprises a first stage of a program for summing image data by the uniform sampling method (step SA410) up to the acquisition of a feature amount which is a saturation emphasis indicator S (step SA420), and hardware for implementing this first stage of the program. The image processing unit comprises the latter stage of the program for performing conversion of image data (step SA440), and hardware for implementing this latter stage of the program.

Regarding contrast correction, lightness compensation and saturation emphasis, it is determined whether to perform image processing in each case. However, it is not absolutely necessary to make a choice as to whether or not to perform image processing. Specifically, a degree of emphasis degree is set for each, and image processing may be performed with the set degree of emphasis.

Next, the operation of this embodiment having the aforesaid construction will be described.

A photographic image is read by the scanner 11, and printed by the printer 31. Specifically, when the operating system 21a is running on the computer 21, the image processing application 21d is started, and reading of the photograph is started by the scanner 11. After the read image data has been assimilated by the image processing application 21d via the operating system 21a, the picture elements to be processed are set in initial positions. Next, the edginess is determined based on equations (1)-(3) in the step SC110, and the edginess is compared with a threshold value in the step SC120. When the edginess is large, it is determined that the picture element to be processed is an edge picture element, and image data for the corresponding picture element is stored in the work area in the step SC130. In the step SC140, it is determined whether or not picture elements to be processed are to sampled uniformly, and if so, in the step SC150, image data for these picture elements is stored in the work area. The above processing is repeated until it is determined to have been performed for all picture elements in the step SC170 while picture elements to be processed are displaced in the step SC160.

According to this embodiment, image data was stored in the work area, but from the viewpoints of memory capacity and processing time, it is not absolutely necessary to store image data itself in the work area. Specifically, histograms of luminance distribution or saturation substitute value distribution for picture elements determined to be those of the object are generated, and histogram information may therefore be pre-stored in the steps SC120, SC150.

When summation has been performed on all picture elements, luminance distribution histograms are found for the summation result Dist_ave obtained by uniform sampling and the summation result Dist_edg obtained by edge picture element sampling in the step SC310. A parameter for expansion processing is determined based on equations (8), (9) in the step SC320, and a parameter for luminance compensation is determined based on equations (10)-(13) in the step SC330. These parameters are compared with a predetermined threshold value in the step SC340, and if it is determined that image processing should be performed, the luminance is converted based on the aforesaid parameter in the step SC350. In this case, the luminance conversion table shown in FIG. 16 may be generated to reduce the computing amount, and image data may be converted based on equations (14)-(16).

Subsequently, the processed image data may be displayed on the display 32 via the display driver 21c, and if it is satisfactory, it may be printed by the printer 31 via the printer driver 21b. Specifically, the printer driver 21b inputs RGB gradation data with emphasized edges, performs rasterization corresponding to the print head area of the printer 31 after a predetermined mapping, color converts rasterized data from RGB to CMYK, converts CMYK gradation data to binary data, and outputs it to the printer 31.

Due to the above processing, photographic image data read via the scanner 11 is automatically subjected to the optimum contrast correction and lightness compensation, displayed by the display 32, and printed by the printer 31. Specifically, plural feature amounts are obtained using plural evaluation criteria, and optimum image processing is performed with different feature amounts according to the image processing methods of contrast correction or lightness compensation.

However, the invention is not limited to this contrast correction and luminance compensation. In the case also of saturation emphasis, a feature amount is acquired by sampling saturation according to a suitable criterion depending on the saturation emphasis processing, and image processing is performed based on this feature amount. In this way, optimum image processing is performed.

Hence, the computer 21 which is the core of image processing calculates the luminance distribution based on the summation results sampled according to different evaluation criteria in the step SC310, obtains different feature amounts from different luminance distribution histograms in the steps SC320 and SC330, and converts image data based on these feature amounts in the step SC350. This permits optimum image processing.

Embodiment 4

Next, an embodiment will be described concerned mainly with image evaluation which is an indicator for image processing.

Figure 44:
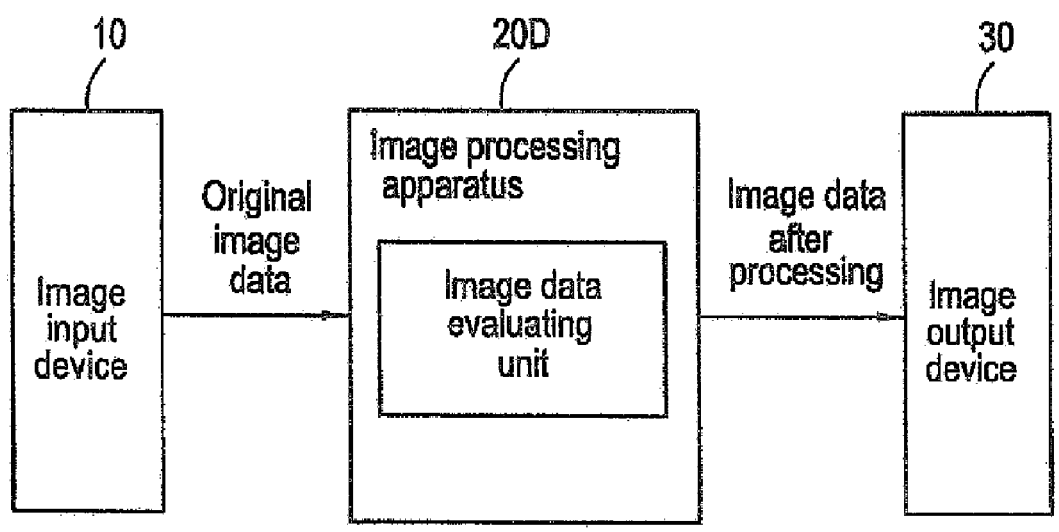
FIG. 44 is a block diagram of an image processing system in which an image processing apparatus according to one embodiment of this invention is applied.

FIG. 44 is a block diagram of an image processing system which performs image processing by implementing an image evaluation method according to one embodiment of this invention. A typical hardware construction is similar to the system shown in FIG. 2.

In FIG. 44, the image reader 10 outputs photographic image data as dot matrix picture elements to an image processing apparatus 20D. The image processing apparatus 20D calculates an evaluation result by summing the image data after predetermined processing, determines the content and extent of image processing based on the evaluation result, and then performs image processing. The image processing apparatus 20D outputs the processed image data to an image output device 30, and the image output device outputs the processed image as dot matrix picture elements.

The image processing apparatus 20D sums the image data beforehand, and calculates an evaluation result for the corresponding image. The image data are summed individually using plural evaluation criteria, and are combined by varying the weighting according to predetermined conditions. Therefore, the image processing apparatus 20D is an image data evaluation unit.

Figure 45:
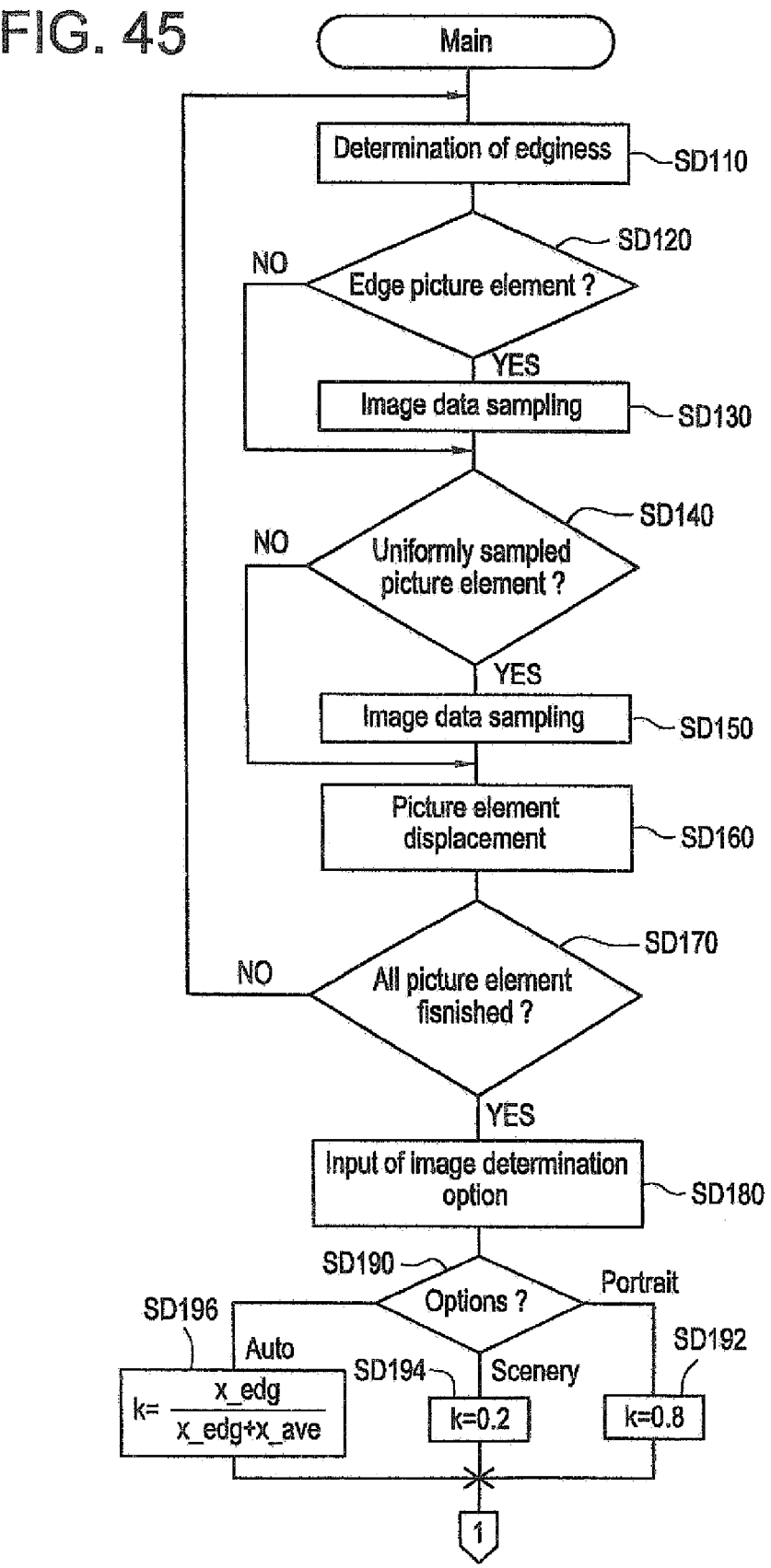
FIG. 45 is a flowchart showing an image processing part in an image processing apparatus according to this invention.

Image evaluation and associated image processing are performed in the computer 21 by an image processing program corresponding to a flowchart such as is shown in FIG. 45. The flowchart shown in the figure corresponds to the first stage of image evaluation in the image processing program, and processing is performed to obtain a predetermined evaluation result by summing the image data according to plural evaluation criteria. The basic method of image evaluation is substantially identical to that described above however in the following description, a simple evaluation result is obtained by using image evaluation options.

According to this embodiment, two of the evaluation criteria used will be described. Common points are that in both cases, picture elements are thinned according to a predetermined criterion instead of considering the whole image, and the luminance of the sampled picture elements is summed. A difference is that whereas in one case, picture elements are sampled uniformly, in the other case, edge picture elements are selected. The luminance summation results are described hereafter, but the image evaluation can be changed by changing the sampling method in this way. Uniform sampling of picture elements means that the luminance is summed for all picture elements in the image, and the luminance distribution is determined for the image as a whole. The evaluation is therefore useful as a reference when a scenic photograph is dark overall or contrast is narrow. In the other method, as edge picture elements are a sharp part of the image, the luminance is summed for picture elements related to the object in the image. For example, provided that the object is sufficiently light even if the background is dark, an evaluation result is obtained where the image is sufficiently light. According to this embodiment, the image is determined by suitably combining two evaluation criteria, i.e. a criterion selected by the operator or automatic processing.

Referring now to the flowchart of FIG. 45, in steps SD110-SD170, image data comprising dot matrix picture elements is main scanned in the horizontal direction and auxiliary scanned in the vertical direction as shown in FIG. 24 as described in the aforesaid embodiment, and image data for edge picture elements and uniformly sampled picture elements is stored in the work area.

Figure 46:
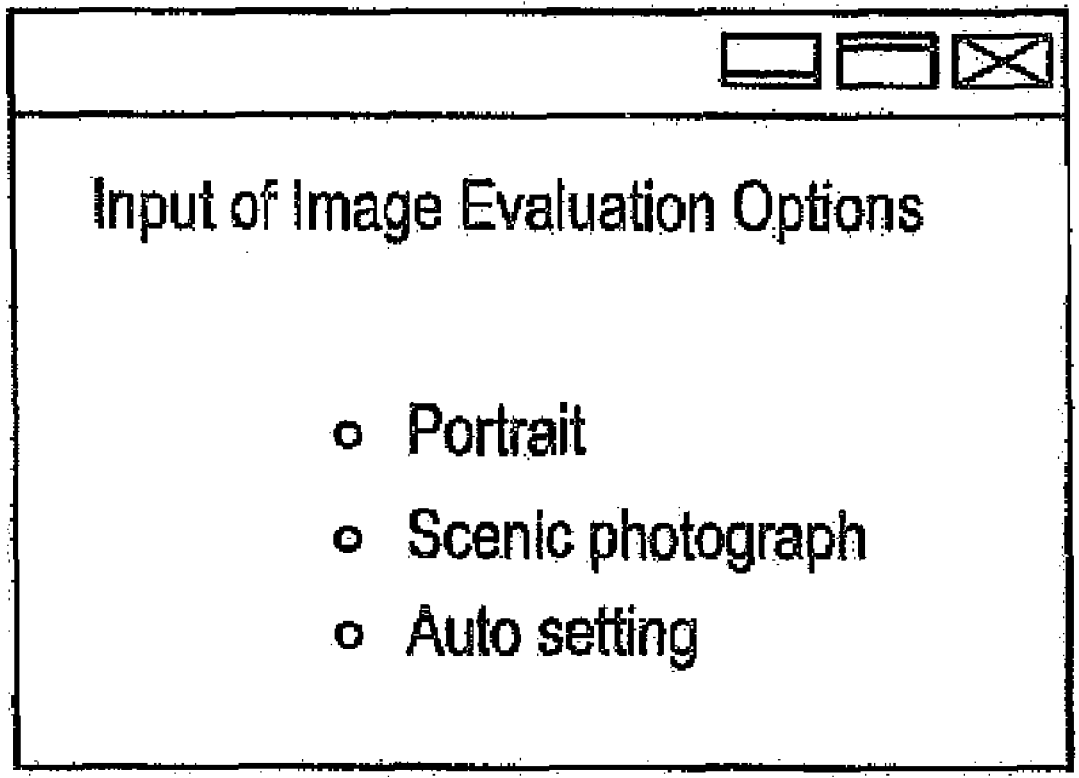
FIG. 46 is a block diagram showing an image evaluation option input screen.

After luminance is summed for all picture elements concerned by these various sampling methods, image evaluation options are input in a step SD180. FIG. 46 shows an image evaluation option input screen displayed on the display 32. Three choices are available: portrait, scenic photograph and automatic setting.

Figure 47:
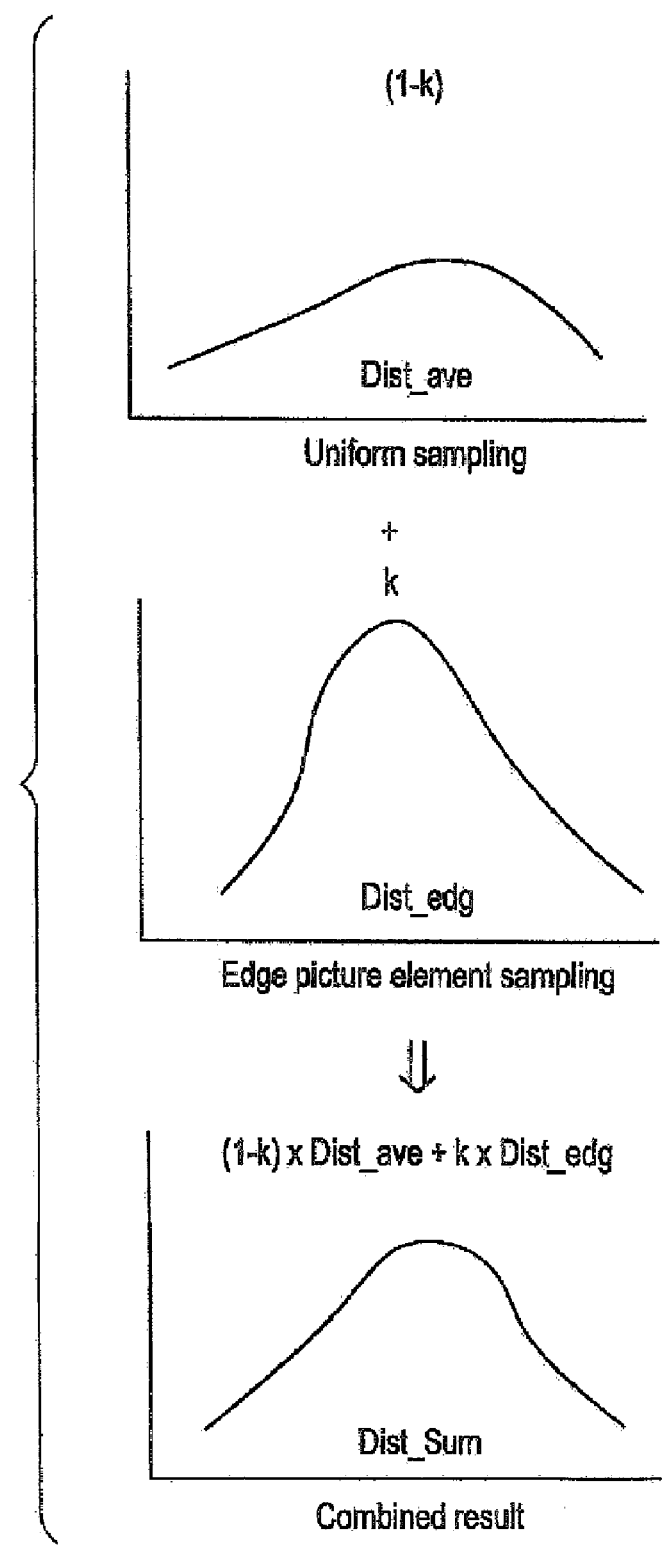
FIG. 47 is a diagram showing how individual sampling results are converted to weightings and combined.

As shown in FIG. 47, weightings must be adjusted in order to generate a histogram to evaluate the image which is obtained by combining a luminance histogram obtained by uniform sampling and a luminance histogram obtained by edge sampling.

When the weighting coefficient k is adopted, a summation result Dist_Sum for evaluation is obtained from the uniform sampling summation result Dist_ave and the edge sampling summation result Dist_edg by the relation:

$$\text{Dist\_Sum} = k \times \text{Dist\_edg} + (1-k) \times \text{Dist\_ave} \tag{68}$$

The closer the weighting coefficient k approaches "0" the more the whole image is emphasized, and the closer it approaches "1", the more the object in the photograph is emphasized.

As a result, after setting the options on the image evaluation option input screen shown in FIG. 46, the routine branches depending on the option in a step SD190. When a portrait is selected, k is set to 0.8 in a step SD192, and when a scenic photograph is selected, k is set to 0.2 in a step SD194.

The remaining option is the "AUTO" setting. In this auto setting, based on the edge picture elements sampled as described above, the image may be considered as a scenic photograph and the weighting coefficient approaches "0" when there are few edge picture elements, while the image may be considered as a portrait and the weighting coefficient approaches "1" when there are many edge picture elements By using the sampling number x_edg of edge picture elements and the uniform sampling number x_ave, the weighting coefficient may be computed from:

$$k = x\_edg/(x\_edg + x\_ave) \tag{69}$$

in a step SD196, and the summation result Dist_Sum used for evaluation can be obtained.

After the summation result Dist_Sum used for evaluation is obtained, image evaluation can be performed. Of course, a further determination may be made using this summation result, and it may basically be varied as necessary depending on the image processing which uses the summation result.

Figure 48:
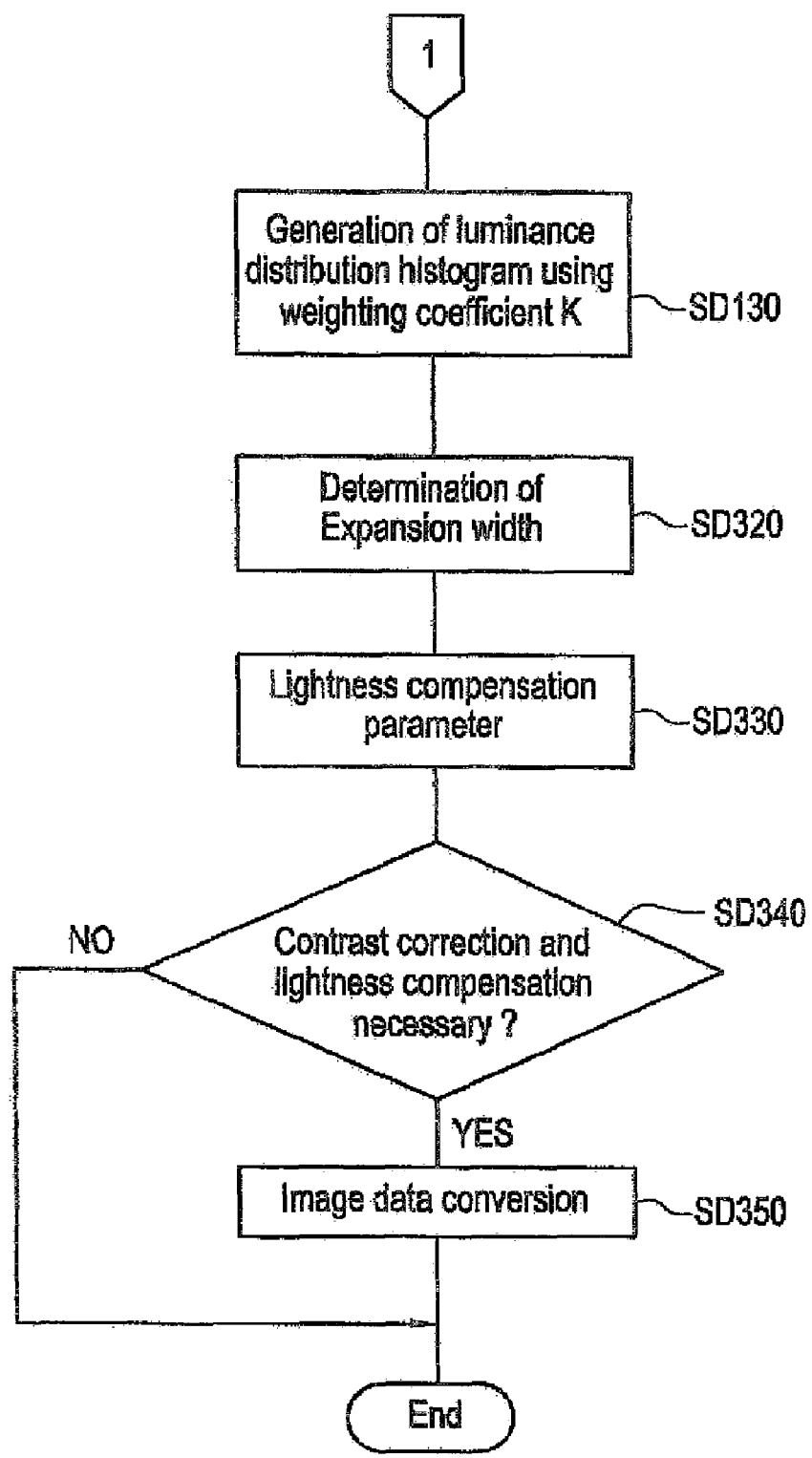
FIG. 48 is a flowchart showing the latter stage of image evaluation and an image processing part.

Subsequently, the optimum image processing is determined based on the summation results and performed. As an example, FIG. 48 shows a flowchart to perform expansion of contrast and luminance compensation. In a basic technique to increase contrast according to this embodiment, the luminance distribution is found based on image data as in the aforesaid embodiment, and if this luminance distribution uses only part of the actual gradation width (255 gradations), it is expanded.

Therefore, in a step SD310, a histogram of luminance distribution is generated as the summation result Dist_Sum from the weighting coefficient k, and the expansion width is determined in a step SD320. The expansion width determining method is as described above. The generation of a predetermined conversion chart corresponds to the expansion width determination processing of the step S320, so image data can be modified by referring to this chart. By expanding the luminance range, not only is the contrast emphasized, but it is also very useful to adjust the luminance range at the same time. Therefore the luminance of the image is determined in a step SD330, and a parameter is generated for the correction.

In this case, the summation results used for determining the image are used as evaluation criteria. Contrast correction and luminance compensation are performed, but specific examples of image processing are not limited to this, and therefore various summation results may be used as evaluation criteria.

Examples of image processing are saturation emphasis or edge emphasis. In these cases, image vividness and image sharpness need to be evaluated. The summation maybe performed by the above methods.

It may be determined whether image processing is performed regarding contrast correction, luminance compensation, saturation emphasis and edge emphasis, but it is not absolutely necessary to make a choice as to whether or not to perform image processing. Specifically, a degree of emphasis is set for each, and image processing is performed using this set degree of emphasis.

Next, the action of this embodiment having the aforesaid construction will be described.

Assume that a photographic image is read with the scanner 11, and printed by the printer 31. When the operating system 21a is running, the image processing application 21d is started by the computer 21, and reading of a photograph is started relative to scanner 11. After the read image data has been assimilated via the operating system 21a by an image processing application 21d, the picture elements to be processed are set in initial positions. Next, the edginess is determined based on equations (1)-(3) in the step SD110, and the edginess is compared with a threshold value in the step SD120. When the edginess is large, it is determined that the picture element to be processed is an edge picture element, and image data for the corresponding picture element is stored in the work area in the step SD130. In the step SD140, it is determined whether or not picture elements to be processed are to sampled uniformly, and if so, in the step SD150, image data for these picture elements is stored in the work area. The above processing is repeated until it is determined to have been performed for all picture elements in the step SD170 while picture elements to be processed are displaced in the step SD160.

When this has been performed for all picture elements, image data sampled according to different evaluation criteria is stored in different work areas, and in a step SD180, image evaluation options are input. The operator, looking at the image, may select either a portrait or scenic photograph is that can be determined. If it cannot be determined or when it is desired to fully automate operations, the operator selects the auto setting. When a portrait is selected, the weighting coefficient k becomes "0.8", which puts more weight on the summation results for the edge picture elements. When a scenic photograph is selected, the weighting coefficient k becomes "0.2", which puts more weight on uniformly sampled summation results. When the auto setting is selected, the weighting coefficient k is set according to the proportion of edge picture elements. However, in any of these cases plural evaluation criteria are adopted using the weighting coefficient k. This permits a flexible evaluation not limited to just one criterion.

According to this embodiment, image data was stored in the work area, but from the viewpoints of memory capacity and processing time, it is not absolutely necessary to store image data itself in the work area. Specifically, histograms of luminance distribution or saturation substitute value distribution for sampled picture elements are generated, and histogram information may therefore be prestored in the steps SD120, SD150.

When contrast correction and luminance compensation are performed automatically, a weighting coefficient is used, a histogram of luminance distribution is found in the steps SD120, SD150, SD310, a parameter for expansion processing is determined based on equations (8), (9) in the step SD320, and a parameter for luminance compensation is determined based on equations (10)-(13) in the step SD330. These parameters are compared with a predetermined threshold value in a step SD340, and if it is determined that image processing should be performed, the luminance is converted based on the aforesaid parameter in a step SD350. In this case, a luminance conversion table shown in FIG. 16 may be generated to reduce the computing amount, and image data may be converted based on equations (14)-(16).

Subsequently, the processed image data may be displayed on the display 32 via a display driver 21c, and if it is satisfactory, it is printed by the printer 31 via a printer driver 21b. In other words the printer driver 21b inputs RGB gradation data with emphasized edges, performs rasterization corresponding to the print head area of the printer 31 after a predetermined mapping, saturation converts rasterized data from RGB to CMYK, converts CMYK gradation data to binary data, and outputs it to the printer 31.

The photographic image data read via the scanner 11 and printed by the printer 31 or displayed by the display 32, is therefore automatically subjected to optimum contrast correction and luminance compensation. More specifically, the image can be determined more flexibly by adopting plural evaluation criteria, and optimum image processing realized by contrast correction and luminance compensation.

However, the invention is not limited to this contrast correction and luminance compensation. Saturation and edginess are also sampled by plural evaluation criteria and summed, and weighting coefficients are adjusted and added. Therefore, image processing is performed after a flexible determination which is not limited to a single evaluation criterion.

In this way, the computer 21 which is the core of image processing first samples image data for picture elements according to different evaluation criteria in the steps SD120, SD140, and determines the weighting coefficient k in the steps SD192-SD196 based on image evaluation options input in the step SD180. It then generates a luminance distribution histogram by adding summation results in the step SD310 using these weighting coefficients, and performs optimum image processing in the steps SD310-SD350.

We claim:

1. An image processing method of processing image data comprising:
   inputting image data comprising a plurality of pixels;
   carrying out a plurality of predetermined statistical operations based on the image data of each pixel, thereby obtaining statistical results;
   evaluating the image data based on the statistical results;
   applying a plurality of evaluation criteria to the image data, thereby obtaining a plurality of evaluation results;
   applying weighting to each evaluation result;
   adding up the weighted evaluation results; and
   obtaining a single evaluation result for the image,
   wherein the statistical result is obtained based on sample data obtained by applying a predetermined sampling technique to the image data, the evaluation results are obtained individually by applying a plurality of different sampling techniques, and the single evaluation result is obtained by combining each of the statistical results with predetermined weighting.

2. The method according to claim 1, wherein the evaluation criteria include an evaluation criterion that pixels are sampled uniformly on the basis of a predetermined criterion and a statistical process is carried out.

3. The method according to claim 1, wherein the evaluation criteria include an evaluation criterion that each pixel having a larger change degree than adjacent pixels is evaluated and assigned a high degree of importance and added up.

4. The method according to claim 1, wherein the weighting applied to each evaluation criterion is variable.

5. The method according to claim 1, wherein the weighting applied to each evaluation result is varied based on the evaluation result which is further based on the evaluation criterion.

6. A computer-readable medium of which an image processing program is recorded, said program inputting image data comprising a plurality of pixels in a computer, carrying out a plurality of predetermined statistical operations based on image data of each pixel, thereby obtaining statistical results, and evaluating the image data based on the statistical results, said program realizing a method comprising:
   applying a plurality of evaluation criteria to the image data, thereby obtaining a plurality of evaluation results;

applying weighting to each of the evaluation results;
adding up the weighted evaluation results; and
obtaining a single evaluation result for the image,
wherein the statistical result is obtained based on sample data obtained by applying a predetermined sampling technique to the image data, the evaluation results are obtained individually by applying a plurality of different sampling techniques, and the single evaluation result is obtained by combining each of the statistical results with predetermined weighting.

7. An image processing apparatus comprising:

an input unit which inputs image data comprising a plurality of pixels;

an operation unit which carries out a plurality of predetermined statistical operations based on image data of each pixel, thereby obtaining statistical results;

an evaluating unit which evaluates the image data based on the statistical results;

an applying unit which applies a plurality of evaluation criteria to the image data, thereby obtaining a plurality of evaluation results;

a weighting unit which applies weighting to each of the evaluation results;

an adding unit which adds up the weighted evaluation results; and an obtaining unit which obtains a single evaluation result for the image, wherein the statistical result is obtained based on sample data obtained by applying a predetermined sampling technique to the image data, the evaluation results are obtained individually by applying a plurality of different sampling techniques, and the single evaluation result is obtained by combining each of the statistical results with predetermined weighting.

* * * * *